(12) United States Patent
Chowdhary et al.

(10) Patent No.: US 12,259,735 B2
(45) Date of Patent: Mar. 25, 2025

(54) DEEP MODEL REFERENCE ADAPTIVE CONTROLLER

(71) Applicant: THE BOARD OF TRUSTEES OF THE UNIVERSITY OF ILLINOIS, Urbana, IL (US)

(72) Inventors: Girish Chowdhary, Champaign, IL (US); Girish Joshi, Redmond, WA (US); Jasvir Virdi, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 639 days.

(21) Appl. No.: 17/354,912

(22) Filed: Jun. 22, 2021

(65) Prior Publication Data
US 2021/0405659 A1 Dec. 30, 2021

Related U.S. Application Data

(60) Provisional application No. 63/042,996, filed on Jun. 23, 2020.

(51) Int. Cl.
*G05D 1/10* (2006.01)
*G05B 13/02* (2006.01)
(Continued)

(52) U.S. Cl.
CPC .......... *G05D 1/101* (2013.01); *G05B 13/027* (2013.01); *G05D 1/0088* (2013.01); *G06N 3/04* (2013.01); *G06N 3/08* (2013.01)

(58) Field of Classification Search
CPC .... G05D 1/101; G05D 1/0088; G05B 13/027; G06N 3/04; G06N 3/08
(Continued)

(56) References Cited

U.S. PATENT DOCUMENTS

2011/0161267 A1* 6/2011 Chowdhary ............. G06N 3/08
706/21
2021/0103793 A1* 4/2021 Huang .................. G06N 3/045

FOREIGN PATENT DOCUMENTS

CN    108764122 A    11/2018
WO      0062135 A1   10/2000
WO    2018237121 A1  12/2018

OTHER PUBLICATIONS

Joshi, et al., "Deep Model Reference Adaptive Control", Cornell University Website https://arxiv.org/abs/1909.08602, Sep. 18, 2019, 9 pgs.

(Continued)

*Primary Examiner* — Mahmoud S Ismail
(74) *Attorney, Agent, or Firm* — GUNTIN & GUST, PLC; Matthew Tropper

(57) ABSTRACT

Aspects of the subject disclosure may include, for example, determining, at a slower time-scale, inner layer weights of an inner layer of a deep neural network; providing periodically to an outer layer of the deep neural network from the inner layer, a feature vector based upon the inner layer weights; and determining, at a faster time-scale, outer layer weights of the outer layer, wherein the outer layer weights are determined in accordance with a Model Reference Adaptive Control (MRAC) update law that is based upon the feature vector from the inner layer, and wherein the outer layer weights are determined more frequently than the inner layer weights. Other embodiments are disclosed.

20 Claims, 11 Drawing Sheets

(51) Int. Cl.
  *G05D 1/00* (2006.01)
  *G06N 3/04* (2023.01)
  *G06N 3/08* (2023.01)
(58) Field of Classification Search
  USPC .............................................................. 701/3
  See application file for complete search history.

(56) References Cited

OTHER PUBLICATIONS

Kocic, Jelena et al., "An End-to-End Deep Neural Network for Autonomous Driving Designed for Embedded Automotive Platforms", MDPI Sensors, Sensors 2019, 19, 2064; doi:10.3390/s19092064 https://www.ncbi.nlm.nih.gov/pmc/articles/PMC6539483/pdf/sensors-19-02064.pdf, May 3, 2019, 26 pgs.

Tai, et al., "Autonomous exploration of mobile robots through deep neural networks", International Journal of Advanced Robotic System. Tai Et Al, https://journals.sagepub.com/doi/pdf/10.1177/1729881417703571, Jul. 1, 2017, 9 pgs.

Chowdhary, et al., "A Singular Value Maximizing Data Recording Algorithm for Concurrent Learning", 2011 American Control Conference on O'Farrell Street, San Francisco, CA, USA, Jun. 29, 2011, 6 pgs.

Chowdhary, et al., "Bayesian Nonparametric Adaptive Control Using Gaussian Processes", IEEE Transactions on Neural Networks and Learning Systems, vol. 26, No. 3, Mar. 2015, Mar. 3, 2015, 14 pgs.

Chowdhary, et al., "Concurrent learning adaptive control of linear systems with exponentially convergent bounds", International Journal of Adaptive Control and Signal Processing Int. J. Adapt. Control Signal Process. 2013; 27:280-301 Published online May 11, 2012 in Wiley Online Library (wileyonlinelibrary.com). DOI: 10.1002/acs. 2297, May 11, 2012, 22 pgs.

Joshi, et al., "Adaptive Control using Gaussian-Process with Model Reference Generative Network", 2018 IEEE Conference on Decision and Control (CDC) Miami Beach, FL, USA, Dec. 17-19, 2018, Dec. 17, 2018, 7 pgs.

Joshi, et al., "Robust Control of Quadrotors using Neuro-Adaptive Control Augmented with State Estimation", http://arc.aiaa.org | DOI: 10.2514/6.2017-1526, Jan. 9, 2017, 18 pgs.

Liu, et al., "Gaussian Processes for Learning and Control", IEEE Control Systems magazine »> Oct. 2018, Oct. 1, 2018, 34 pgs.

\* cited by examiner

400

DEEP MODEL REFERENCE ADAPTIVE CONTROLLER

CROSS-REFERENCE TO RELATED APPLICATION(S)

The present application claims the benefit of priority to U.S. Provisional Patent Application No. 63/042,996, filed on Jun. 23, 2020, the disclosure of which is incorporated by reference herein in its entirety (including each Appendix attached thereto).

STATEMENT REGARDING FEDERALLY SPONSORED RESEARCH OR DEVELOPMENT

This invention was made with government support under contract DE-NA-0003525 awarded by the U.S. Department of Energy's National Nuclear Security Administration. The government has certain rights in the invention.

FIELD OF THE DISCLOSURE

The subject disclosure relates to a Deep Model Reference Adaptive Controller.

BACKGROUND

Deep Neural Networks (DNN) have shown tremendous empirical performance in many applications and various fields such as computer vision, speech recognition, translation, natural language processing, robotics, autonomous driving and many more [1] (of note, various numbers in square brackets, e.g., "[1]", refer to References detailed towards the end of this document). Unlike their counterparts such as shallow networks with Radial Basis Function features [2], [3], deep networks learn features by learning the weights of nonlinear compositions of weighted features arranged in a directed acyclic graph [4]. It is now pretty clear that deep neural networks are outshining other classical machine-learning techniques [5]. Leveraging these successes, there have been many exciting new assertions regarding the control of complex dynamical systems in simulation using Deep Reinforcement Learning [6]. However, Deep Reinforcement Learning (D-RL) methods typically do not guarantee stability or even the boundedness of the system during the learning transient. Hence, despite significant simulation success, D-RL has seldomly been used in safety-critical applications. D-RL methods often make the ergodicity assumption, requiring that there is a nonzero probability of the system states returning to the origin. In practice, such a condition is typically enforced by resetting the simulation when a failure occurs. Unfortunately, however, real-world systems typically do not have this reset option. Unlike D-RL, much effort has been devoted in the field of adaptive control to ensuring that the system stays stable during learning.

Model Reference Adaptive Control (MRAC) is one such leading method for adaptive control that seeks to learn a high-performance control policy in the presence of significant model uncertainties [7]-[9]. A key idea in MRAC is to find an update law for a parametric model of the uncertainty that ensures that the candidate Lyapunov function is non-increasing. Many update laws have been proposed and analyzed, which include (but are not limited to) $\sigma$-modification [10], e-modification [11], and projection-based updates [9]. More modern laws extending the classical parametric setting (including l1-adaptive control and concurrent learning [13]) have also been studied.

A more recent work that has been introduced is the Gaussian Process Model Reference Adaptive Control (GP-MRAC), which utilizes a Gaussian Process (GP) as a model of the uncertainty. A GP is a Bayesian nonparametric adaptive element that can adapt both its weights and the structure of the model in response to the data. It has been shown that GP-MRAC has strong long-term learning properties as well as high control performance [14], [15]. However, GPs are "shallow" machine learning models, and do not utilize the power of learning complex features through compositions as deep networks do (see, e.g., the discussion of "Deep Networks and Feature Spaces in Machine Learning" discussed below).

BRIEF DESCRIPTION OF THE DRAWINGS

Reference will now be made to the accompanying drawings, which are not necessarily drawn to scale, and wherein.

DETAILED DESCRIPTION

Figure 1:
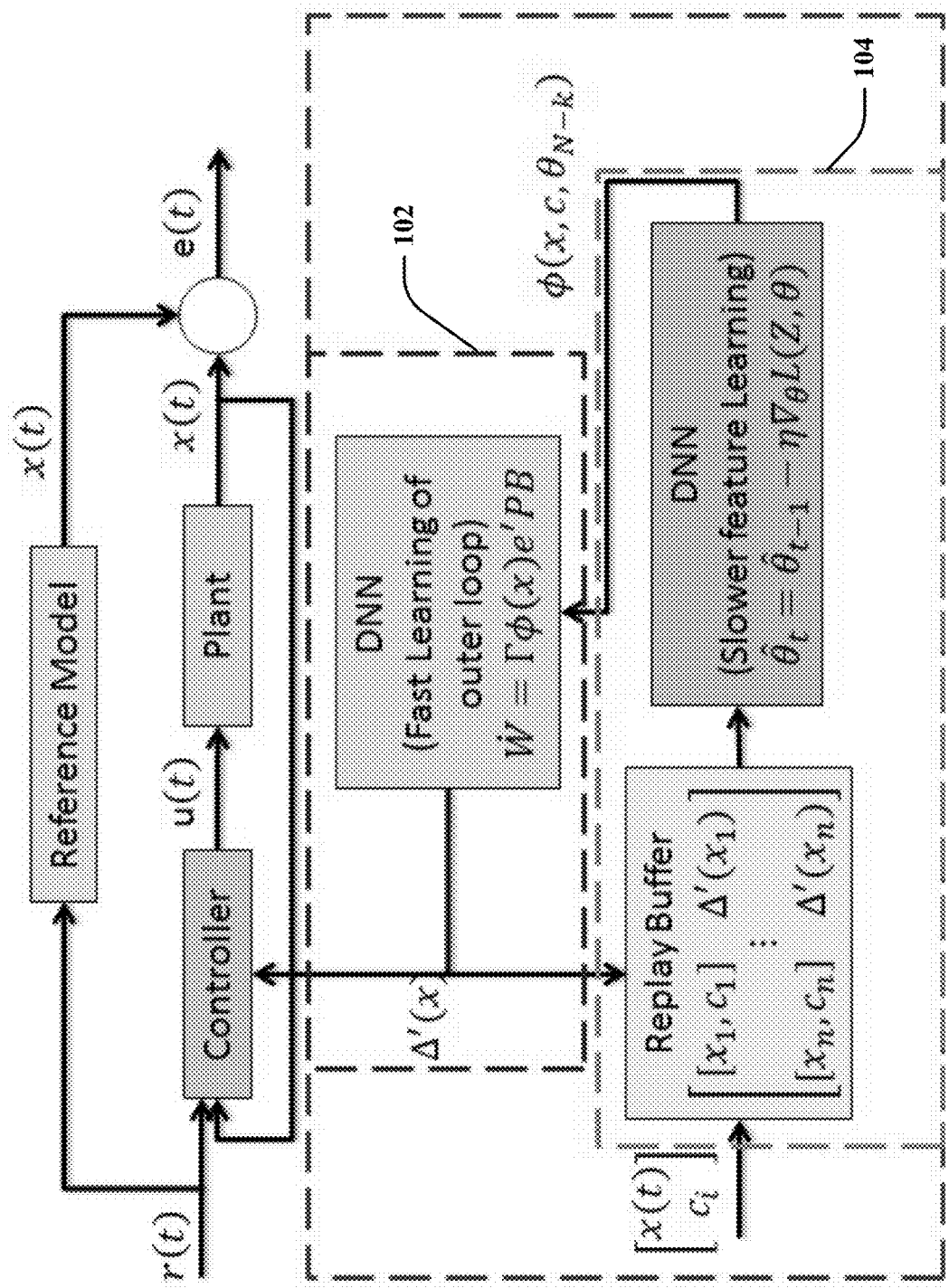
FIG. 1 is a block diagram illustrating an example, non-limiting embodiment of a controller in accordance with various aspects described herein.

The subject disclosure describes, among other things, illustrative embodiments for a controller, such as for an autonomous vehicle. Other embodiments are described in the subject disclosure.

One or more aspects of the subject disclosure include a neuroadaptive architecture that is sometimes referred to herein as a Deep Neural Network based Model Reference Adaptive Control (DMRAC). In various examples, the architecture utilizes the power of deep neural network representations for modeling significant nonlinearities while marrying the deep neural network with the boundedness guarantees that characterize MRAC-based controllers.

One or more aspects of the subject disclosure demonstrate through simulations and analysis that DMRAC can subsume previously studied learning-based MRAC methods, such as concurrent learning and GP-MRAC.

As described herein, various embodiments provide a DMRAC architecture that is highly powerful and can be utilized for high-performance control of nonlinear systems (e.g., with long-term learning properties).

As described herein, various embodiments utilize the power of deep learning to implement even more powerful learning-based MRAC architectures than those utilizing GPs.

As described herein, various embodiments address a critical question: How can MRAC utilize deep networks while guaranteeing stability? Towards that goal, various embodiments: a) provide an MRAC architecture that utilizes DNNs as the adaptive element; b) provide an algorithm for the online update of the weights of the DNN by utilizing a dual time-scale adaptation scheme (in one specific example of such algorithm, the weights of the outermost layer are adapted in real time, while the weights of the inner layers (which inner layers can be, for example, N−1 multiple layers) are adapted using batch updates); c) provide a theory to guarantee Uniform Ultimate Boundedness (UUB) of the entire DMRAC controller; and/or d) demonstrate through simulation results that this MRAC architecture has desirable long-term learning properties.

As described herein, various embodiments demonstrate how DNNs can be utilized in stable learning schemes for adaptive control of safety-critical systems (this provides an alternative, for example, to Deep Reinforcement Learning for adaptive control applications requiring stability guarantees).

As described herein, various embodiments provide a dual time-scale analysis scheme that should be generalizable to other DNN-based learning architectures, including reinforcement learning.

As described herein, various embodiments provide an advanced fault tolerant controller.

As described herein, various embodiments provide a learning-based highly powerful controller architecture for high performance nonlinear systems.

As described herein, various embodiments provide a DMRAC that can be used for navigation, guidance and/or control of robots. Various embodiments can be used for aircraft and/or ground robots (as well as other vehicles).

As described herein, various embodiments can be used for high performance aerospace and/or wheeled robot applications.

Reference will now be made to certain Deep Networks and Feature Spaces in Machine Learning. A key idea in machine learning is that a given function can be encoded with weighted combinations of feature vector $\Phi \in \mathcal{F}$, s.t $\Phi(x)=[\phi_1(x), \phi_2(x), \ldots, \phi_k(x)]^T \in \mathbb{R}^k$, and $W^* \in \mathbb{R}^{k \times m}$ a vector of 'ideal' weights s.t $\|y(r)-W^{*T}\Phi(x)\|_\infty \leq \epsilon(x)$. Instead of hand picking features, or relying on polynomials, Fourier basis functions, comparison-type features used in support vector machines [16], or Gaussian Processes [18], DNNs utilize composite functions of features arranged in a directed acyclic graphs, i.e $$\Phi(x) = \phi_n(\theta_{n-1}, \phi_{n-1}(\theta_{n-2}, (\theta_{n-2}, \phi_{n-2}(\ldots))))$$

where θi's are the layer weights. The universal approximation property of the DNN with commonly used feature functions such as sigmoidal, tanh, and RELU is proved in the work by Hornik's [19] and shown empirically to be true by recent results [20]-[22]. Hornik et al. argued the network with at least one hidden layer (also called Single Hidden Layer (SHL) network) to be a universal approximator. However, empirical results show that the networks with more hidden layers show better generalization capability in approximating complex function. While the theoretical reasons behind better generalization ability of DNN are still being investigated [23], for the purposes of this discussion, the assumption will be that it is indeed true, and a focus of efforts will be with respect to designing a practical and stable control scheme using DNNs.

Reference will now be made to certain Neuro-adaptive Control. Neural networks in adaptive control have been studied for a very long time. The seminal paper by Lewis utilized Taylor series approximations to demonstrate uniform ultimate boundedness with a single hidden neural network. SHL networks are nonlinear in the parameters; hence, the analysis for linear in parameter, radial basis function neural networks introduced by Sanner and Slotine does not directly apply [2]. The back-propagation type scheme with non-increasing Lyapunov candidate as a constraint, introduced in Lewis' work has been widely used in Neuro-adaptive MRAC. Concurrent Learning MRAC (CL-MRAC) is a method for learning-based neuro-adaptive control that has been developed to improve the learning properties and provide exponential tracking and weight error convergence guarantees. However, similar guarantees have not been available for SHL networks. There has been much work, towards including deeper neural networks in control; however, strong guarantees like those in MRAC on the closed-loop stability during online learning are not available. As described herein, various embodiments provide a dual time-scale learning approach which ensures such guarantees. The approach of such embodiments should be generalizable to other applications of deep neural networks, including policy gradient Reinforcement Learning (RL) [25] which is very close to adaptive control in its formulation and also to more recent work in RL for control [26].

Reference will now be made to certain Stochastic Gradient Descent and Batch Training. Considered now are a deep network model with parameters θ, and the problem of optimizing a non-convex loss function L(Z, θ), with respect to θ. Let L (Z, θ) be defined as average loss over M training sample data points:

$$L(Z, \theta) = \frac{1}{M}\sum_{i=1}^{M} \ell(Z_i, \theta) \tag{1}$$

where M denotes the size of sample training set. For each sample size of M, the training data are in the form of M-tuple $Z^M=(Z_1, Z_2, \ldots Z_M)$ of Z-valued random variables drawn according to some unknown distribution $P \in \mathcal{P}$. Where each Zi={xi, yi} are the labelled pair of input and target values.

For each P the expected loss can be computed as $E_p(l(Z, \theta))$. The above empirical loss (1) is used as proxy for the expected value of loss with respect to the true data generating distribution (of note, various numbers in parenthesis, e.g., "(1)", refer to corresponding equations detailed throughout this document).

Optimization based on the Stochastic Gradient Descent (SGD) algorithm uses a stochastic approximation of the gradient of the loss L (Z, $\theta$) obtained over a mini-batch of M training examples drawn from buffer $\mathcal{B}$. The resulting SGD weight update rule:

$$\theta_{k+1} = \theta_k - \eta \frac{1}{M} \sum_{i=1}^{M} \nabla_\theta \ell(Z_i, \theta_k) \quad (2)$$

where $\eta$ is the learning rate. Further details on generating i.i.d samples for DNN learning and the training details of network are provided below (see, e.g., the "Adaptive Control Using Deep Nets (DMRAC)" section below).

Reference will now be made to a certain System Description according to various embodiments. More particularly, reference will now be made to certain formulation of Model Reference Adaptive Control (see e.g. [7]) according to various embodiments. Considered now is the following system with uncertainty $\Delta(x)$:

$$\dot{x}(t) = Ax(t) + B(u(t) + \Delta(x)) \quad (3)$$

where $x(t) \in \mathbb{R}^n$, $t \geq 0$ is the state vector, $u(t) \in \mathbb{R}^m$, $t \geq 0$ is the control input, $A \in \mathbb{R}^{n \times n}$, $B \in \mathbb{R}^{n \times m}$ are known system matrices and the assumption is made that the pair (A, B) is controllable. The term $\Delta(x): \mathbb{R}^n \to \mathbb{R}^m$ is matched system uncertainty and be Lipschitz continuous in $x(t) \in \mathcal{D}_x$. Let $\mathcal{D}_x \subset \mathbb{R}^n$ be a compact set and the control u(t) is assumed to belong to a set of admissible control inputs of measurable and bounded functions, ensuring the existence and uniqueness of the solution to (3).

The reference model is assumed to be linear and therefore the desired transient and steady-state performance is defined by selecting the system eigenvalues in the negative half plane. The desired closed-loop response of the reference system is given by:

$$\dot{x}_{rm}(t) = A_{rm} x_{rm}(t) + B_{rm} r(t) \quad (4)$$

where $x_{rm}(t) \in \mathcal{D}_x$ and $A_{rm} \in \mathbb{R}^{n \times n}$ is Hurwitz and $B_{rm} \in \mathbb{R}^{n \times r}$. Furthermore, the command $r(t) \in \mathbb{R}^r$ denotes a bounded, piece wise continuous, reference signal and the assumption is made that the reference model (4) is bounded input-bounded output (BIBO) stable [7].

The true uncertainty $\Delta(x)$ is unknown, but it is assumed to be continuous over a compact domain $\mathcal{D}_x \subset \mathbb{R}^n$. A Deep Neural Networks (DNN) have been widely used to represent a function when the basis vector is not known. Using DNNs, a non linearly parameterized network estimate of the uncertainty can be written as $$\hat{\Delta}(x) \triangleq \theta_n^T \Phi(x),$$

where $\theta_n \in \mathbb{R}^{k \times m}$ are network weights for the final layer and $\Phi(x) = \phi_n(\theta_{n-1}, \phi_{n-1}(\theta_{n-2}, \phi_{n-2}(\ldots))))$, is a k dimensional feature vector which is function of inner layer weights, activations and inputs. The basis vector $\Phi(x) \in \mathcal{F}: \mathbb{R}^n \to \mathbb{R}^k$ is considered to be Lipschitz continuous to ensure the existence and uniqueness of the solution (3).

Still referring to a certain System Description and Model Reference Adaptive Control according to various embodiments, reference will now be made more particularly to a Total Controller according to various embodiments. An aim here is to construct a feedback law u(t), $t \geq 0$, such that the state of the uncertain dynamical system (3) asymptotically tracks the state of the reference model (4) despite the presence of matched uncertainty.

A tracking control law consisting of linear feedback term $u_{pd} = Kx(t)$, a linear feed-forward term $u_{crm} = K_r r(t)$ and an adaptive term $V_{ad}(t)$ form the total controller:

$$u = u_{pd} + u_{crm} - v_{ad} \quad (5)$$

The baseline full state feedback and feed-forward controller is designed to satisfy the matching conditions such that $A_{rm} = A - BK$ and $B_{rm} = BK_r$. For the adaptive controller of various embodiments, it is ideally desired that $v_{ad}(t) = \Delta(x(t))$. Since true uncertainty information is not available, a DNN is used to provide an estimate of the system uncertainties in the controller as $v_{ad}(t) = \hat{\Delta}(x(t))$.

Still referring to a certain System Description and Model Reference Adaptive Control according to various embodiments, reference will now be made more particularly to a Deep Model Reference Generative Network (D-MRGEN) for Uncertainty Estimation according to various embodiments. Unlike traditional MRAC or SHL-MRAC weight update rule, where the weights are moved in the direction of diminishing tracking error, training a deep Neural network is much more involved. Feed-Forward networks like DNNs are trained in a supervised manner over a batch of i.i.d data. Deep learning optimization is based on Stochastic Gradient Descent (SGD) or its variants. The SGD update rule relies on a stochastic approximation of the expected value of the gradient of the loss function over a training set or mini-batches.

To train a deep network to estimate the system uncertainties, unlike MRAC what are needed are labeled pairs of state-true uncertainties $\{x(t), \Delta(x(t))\}$ i.i.d samples. Since there is not access to true uncertainties ($\Delta(x)$), a generative network is used to generate estimates of $\Delta(x)$ to create the labeled targets for deep network training. For certain details of a generative network architecture in the adaptive controller, see [15]. This generative network is derived from separating the DNN into inner feature layer and the final output layer of the network. Also, separated in time-scale are the weight updates of these two parts of DNN. A temporally separated weight update algorithm for the DNN, approximating system uncertainty, is presented in more detail below.

Still referring to a certain System Description and Model Reference Adaptive Control according to various embodiments, reference will now be made more particularly to an Online Parameter Estimation Law according to various embodiments (in one or more of these embodiments, an online parameter update is utilized, wherein the update is on the go; this is in contrast, for example, to conventional Deep Neural Networks that typically collect data (or are given a batch of data) and the learning happens offline). The last layer of DNN with learned features from inner layer forms the Deep-Model Reference Generative Network (D-MR-GeN). The MRAC learning rule is used to update pointwise in time, the weights of the D-MRGeN in the direction of achieving asymptotic tracking of the reference model by the actual system.

Since the D-MRGeN estimates are used to train DNN model, first studied are the admissibility and stability characteristics of the generative model estimate $\Delta'(x)$ in the controller (5). To achieve the asymptotic convergence of the reference model tracking error to zero, the D-MRGeN estimate is used in the controller (5) as $v_{ad}=\Delta'(x)$:

$$v_{ad}(t) = W^T \phi_n(\theta_{n-1}, \phi_{n-1}(\theta_{n-2}, \phi_{n-2}(\dots))) \tag{6}$$

To differentiate the weights of D-MRGeN from last layer weights of DNN "$\theta_n$", D-MRGeN weights are denoted as "W".

Assumption 1: Appealing to the universal approximation property of Neural Networks it is that, for every given basis functions $\Phi(x) \in \mathcal{F}$ there exists unique ideal Weights $W^* \in \mathbb{R}^{k \times m}$ and $\epsilon_1(x) \in \mathbb{R}^m$ such that the following approximation holds:

$$\Delta(x) = W^{*T}\Phi(x) + \epsilon_1(x), \forall x(t) \in \mathcal{D}_x \subset \mathbb{R}^n \tag{7}$$

Fact 1: The network approximation error $\epsilon_1(x)$ is upper bounded, s.t $\bar{\epsilon}_1 = \sup_{x \in \mathcal{D}_x} \|\epsilon_1(x)\|$, and can be made arbitrarily small given sufficiently large number of basis functions.

The reference model tracking error is defined as $e(t) = x_{rm}(t) - x(t)$. Using (3) & (4) and the controller of form (5) with adaptation term $v_{ad}$ the tracking error dynamics can be written as:

$$\dot{e}(t) = \dot{x}_{rm}(t) - \dot{x}(t) \tag{8}$$

$$\dot{e}(t) = A_{rm}e(t) + \tilde{W}^T \Phi(x) + \epsilon_1(x) \tag{9}$$

where $\tilde{W} = W^* - W$ is error in parameter.

The estimate of the unknown true network parameters $W^*$ are calculated online using the weight update rule (10); correcting the weight estimates in the direction of minimizing the instantaneous tracking error $e(t)$. The resulting update rule for network weights in estimating the total uncertainty in the system is as follows:

$$\dot{W} = \Gamma proj(W, \Phi(x)e(t)'P) \quad W(0) = W_0 \tag{10}$$

where $\Gamma \in \mathbb{R}^{k \times k}$ is the learning rate and $P \in \mathbb{R}^{n \times n}$ is a positive definite matrix. For given Hurwitz $A_{rm}$, the matrix $P \in \mathbb{R}^{n \times n}$ is a positive definite solution of Lyapunov equation $A_{rm}^T P + PA_{rm} + Q = 0$ for given $Q > 0$.

Assumption 2: For uncertainty parameterized by unknown true weight $W^* \in \mathbb{R}^{k \times m}$ and known nonlinear basis $\Phi(x)$, the ideal weight matrix is assumed to be upper bounded s.t $\|W^*\| \leq W_b$. This is not a restrictive assumption.

1) Lyapunov Analysis: The online adaptive identification law (10) guarantees the asymptotic convergence of the tracking errors $e(t)$ and parameter error $\tilde{W}(t)$ under the condition of persistency of excitation [7], [28] for the structured uncertainty. Similar to the results by Lewis for SHL networks [29], it is shown here that under the assumption of unstructured uncertainty represented by a deep neural network, the tracking error is uniformly ultimately bounded (UUB). Below is proof of the following theorem under switching feature vector assumption.

Theorem 1: Consider the actual and reference plant model (3) & (4). If the weights parameterizing total uncertainty in the system are updated according to identification law (10) then the tracking error $\|e\|$ and error in network weights $\|\tilde{W}\|$ are bounded for all $\Phi \in \mathcal{F}$.

Proof: The feature vectors belong to a function class characterized by the inner layer network weights $\theta_i$ s.t $\Phi \in \mathcal{F}$. Below is proof of the Lyapunov stability under the assumption that inner layer of DNN presents a feature which results in the worst possible approximation error compared to network with features before switch.

For the purpose of this proof let $\Phi(x)$ denote feature before switch and $\bar{\Phi}(x)$ be the feature after switch. Define the error $\epsilon_2(x)$ as, $$\epsilon_2(x) = \sup_{\bar{\Phi} \in \mathcal{F}} |W^T \bar{\Phi}(x) - W^T \Phi(x)| \tag{11}$$

Similar to Fact-1, the error $\epsilon_2(x)$ can be upper bounded as $\bar{\epsilon}_2 = \sup_{x \in \mathcal{D}_x} \|\epsilon_2(x)\|$. By adding and subtracting the term $W^T \bar{\Phi}(x)$, the error dynamics (9) can be rewritten with switched basis as, $$\dot{e}(t) = A_{rm}e(t) + W^{*T}\Phi(x) - W^T\Phi(x) + W^T\bar{\Phi}(x) - W^T\bar{\Phi}(x) + \epsilon_1(x) \tag{12}$$

From Assumption-1 it is known there exists a $W^* \forall \Phi \in \mathcal{F}$. Therefore $W^{*T}\Phi(x)$ can be replaced by $w^{*T}\bar{\Phi}(x)$ and the Eq-(12) can be rewritten as $$\dot{e}(t) = A_{rm}e(t) + \tilde{W}^T \bar{\Phi}(x) + W^T(\bar{\Phi}(x) - \Phi(x)) + \epsilon_1(x) \tag{13}$$

For arbitrary switching, for any $\bar{\Phi}(x) \in \mathcal{F}$, the boundedness can be proven by considering worst possible approximation error and therefore can write, $$\dot{e}(t) = A_{rm}e(t) + \tilde{W}^T \bar{\Phi}(x) + \epsilon_2(x) + \epsilon_1(x) \tag{14}$$

Now consider $V(e, \tilde{W}) > 0$ to be a differentiable, positive definite radially unbounded Lyapunov candidate function, $$V(e, \tilde{W}) = e^T P e + \frac{\tilde{W}^T \Gamma^{-1} \tilde{W}}{2} \tag{15}$$

The time derivative of the lyapunov function (15) along the trajectory (14) can be evaluated as:

$$\dot{V}(e, \tilde{W}) = \dot{e}^T P e + e^T P \dot{e} - \tilde{W}^T \Gamma^{-1} \dot{W} \tag{16}$$

Using (14) & (10) in (16), the time derivative of the lyanpunov function reduces to:

$$\dot{V}(e, \tilde{W}) = -e^T Q e + 2e^T P \epsilon(x) \tag{17}$$

where $\epsilon(x) = \epsilon_1(x) + \epsilon_2(x)$ and $\bar{\epsilon} = \bar{\epsilon}_1 + \bar{\epsilon}_2$.

Hence $\dot{V}(e, \tilde{W}) \leq 0$ outside compact neighborhood of the origin e=0, for some sufficiently large $\lambda_{min}(Q)$.

$$\|e(t)\| \geq \frac{2\lambda_{max}(P)\bar{\epsilon}}{\lambda_{min}(Q)} \quad (18)$$

Using the BIBO assumption $x_{rm}(t)$ is bounded for bounded reference signal r(t), thereby x(t) remains bounded. Since $V(e,\tilde{W})$ is radially unbounded the result holds for all $x(0) \in \mathcal{D}_x$. Using the fact, the error in parameters $\tilde{W}$ are bounded through projection operator and further using Lyapunov theory and Barbalats Lemma [31] it can be shown that e(t) is uniformly ultimately bounded in vicinity to zero solution.

From Theorem-1 & (9) and using system theory [32] it can be inferred that as e (t)→0, $\Delta'(x) \to \Delta(x)$ are admissible target values for training DNN features over the data $Z^M = \{\{x_\tau, y_\tau\}\}_{\tau=1}^M$.

Certain details of DNN training according to various embodiments and certain implementation details of DMRAC controller according to various embodiments are presented below.

Reference will now be made to a certain Adaptive Control Using Deep Nets (DMRAC) according to various embodiments. The DNN architecture for MRAC can be trained in two steps. In an embodiment, the DNN is separated into two networks, as shown in the apparatus 100 of FIG. 1. The faster learning outer adaptive network 102 and slower deep feature network 104. DMRAC learns underlying deep feature vector to the system uncertainty using locally exciting uncertainty estimates obtained using a generative network. Between successive updates of the inner layer weights, the feature provided by the inner layers of the deep network is used as the fixed feature vector for outer layer adaptive network update and evaluation. An algorithm for DNN learning and DMRAC controller according to an embodiment is provided in Algorithm 1 (below). Through this architecture of mixing two-time scale learning, fused are the benefits of DNN memory through the retention of relevant, exciting features and robustness, boundedness guarantee in reference tracking. This feature of the presented framework ensures robustness while guaranteeing long term learning and memory in the adaptive network.

Also as indicated in the controller architecture shown in FIG. 1, various embodiments can use contextual state '$c_i$' other than system state x(t) to extract relevant features. These contextual states could be relevant model information not captured in system states. For example, for an aircraft system, vehicle parameters like pitot tube measurement, the angle of attack, engine thrust, and so on. These contextual states can extract features which help in decision making in case of faults. The DNN in DMRAC controller of this embodiment is trained over training dataset $Z^M = \{x_i, \Delta'(x_i)\}_{i=1}^M$, where the $\Delta'(x_i)$ are DMRGeN estimates of the uncertainty. The training dataset $Z_M$ is randomly drawn from a larger data buffer $\mathcal{B}$. Not every pair of data $\{xi, \Delta'(x_i)\}$ from D-MRGeN is added to the training buffer $\mathcal{B}$. The input-target pair is qualified based on kernel independence test such that to ensure collection of locally exciting independent information which provides a sufficiently rich representation of the operating domain. Since the state-uncertainty data is the realization of a Markov process, such a method for qualifying data to be sufficiently independent of previous data-points is necessary. Certain algorithm details to qualify and add a data point to the buffer are provided below.

Still referring to a certain Adaptive Control Using Deep Nets (DMRAC) according to various embodiments, reference will now be made more particularly to Details of Deep Feature Training Using D-MRGeN according to various embodiments. This section provides certain details (according to various embodiments) of the DNN training over data samples observed over n-dimensional input subspace $x(t) \in \mathcal{X} \in \mathbb{R}^n$ and m-dimensional targets subspace $y \in \mathcal{Y} \in \mathbb{R}^m$. The sample set is denoted as $\mathcal{Z}$ where $\mathcal{Z} \in \mathcal{X} \times \mathcal{Y}$.

Of interest are the function approximation tasks for DNN. The function $f_\theta$ is the learned approximation to the model uncertainty with parameters $\theta \in \Theta$, where $\Theta$ is the space of parameters, i.e. $f_\theta: \mathbb{R}^n \to \mathbb{R}^m$. It is assumed that a training data buffer $\mathcal{B}$ has $p_{max}$ training examples, such that the set $Z^{Pmax} = \{Z_i | Z_i \in \mathcal{Z}\}_{i=1}^{Pmax} = \{(x_i, y_i) \in \mathcal{X} \times \mathcal{Y}\}_{i=1}^{Pmax}$. The samples are independently drawn from the buffer $\mathcal{B}$ over probability distribution P. The hypothesis set, which consist of all possible functions $f_\theta$ is denoted as $\mathcal{H}$. Therefore, a learning algorithm $\mathcal{A}$ (in this case SGD) is a mapping from $\mathcal{A}: \mathcal{Z}^{Pmax} \to \mathcal{H}$.

The loss function, which measures the discrepancy between true target y and algorithm's estimated target function value $f_\theta$ is denoted by $L(y, f_\theta(x))$. Specific to certain work presented herein, used is a (2-norm between values i.e. $\mathbb{E}_P(l(y, f_\theta(x)) = \mathbb{E}_P(\|y_i - f_\theta(x_i)\|_2)$ as loss function for DNN training. The empirical loss (1) is used to approximate the loss function since the distribution P is unknown to the learning algorithm. The weights are updated using SGD in the direction of negative gradient of the loss function as given in (2).

Unlike certain conventional DNN training where the true target values $y \in \mathcal{Y}$ are available for every input $x \in \mathcal{X}$, in DMRAC (according to various embodiments) true system uncertainties as the labeled targets are not available for the network training. In various embodiments, used are the part of the network itself (the last layer) with pointwise weight updated according to MRAC-rule as the generative model for the data. The D-MRGEN uncertainty estimates $y = W^T \Phi(x, \theta_1, \theta_2, \ldots \theta_{n-1}) = \Delta'(x)$ along with inputs $x_i$ make the training data set $Z^{Pmax} = \{x_i, \Delta'(x_i)\}_{i=1}^{Pmax}$. Note that used interchangeably are $x_i$ and x(t) as discrete representation of continuous state vector for DNN training. The main purpose of DNN in the adaptive network of various embodiments is to extract relevant features of the system uncertainties, which otherwise is very tedious to obtain without the limits on the domain of operation.

Also demonstrated herein empirically, is that the DNN features trained over past i.i.d representative data retains the memory of the past instances and can be used as the frozen feedforward network over similar reference tracking tasks without loss of the guaranteed tracking performance.

Still referring to a certain Adaptive Control Using Deep Nets (DMRAC) according to various embodiments, reference will now be made more particularly to a Method for Recording Data using MRGeN for DNN Training according to various embodiments. In statistical inference, implicitly or explicitly one always assumes that the training set $Z^M=\{x_i,y_i\}_{i=1}^M$ is composed on M-input-target tuples that are independently drawn from buffer $\mathcal{B}$ over same joint distribution P(x,y). The i.i.d assumption on the data is required for robustness, consistency of the network training and for bounds on the generalization error [33], [34]. In classical generalization proofs one such condition is that $$\frac{1}{p_{max}}\mathbb{X}^T\mathbb{X} \to \gamma \qquad (18)$$

as $p_{max}\to\infty$, where $\mathbb{X}$ denotes the design matrix with rows $\Phi_i^T$. The i.i.d assumption implies the above condition is fulfilled and hence is sufficient but not necessary condition for consistency and error bound for generative modeling.

A capability brought about by DMRAC (according to various embodiments) is a relevant feature extraction from the data. Feature extraction in DNN is achieved by using recorded data concurrently with current data. The recorded data include the state $x_i$ feature vector $\Phi(x_i)$ and associated D-MRGeN estimate of the uncertainty $\Delta'(x_i)$. For a given $\zeta_{tol}\in\mathbb{R}^+$ a simple way to select the instantaneous data point $\{x_i, \Delta'(x_i)\}$ for recording is to require satisfaction of the following condition:

$$\gamma_i = \frac{\|\Phi(x_i)-\Phi_p\|^2}{\|\Phi(x_i)\|} \geq \zeta_{tol} \qquad (19)$$

Where the index p is over the data points in buffer $\mathcal{B}$. The above method assures that only those data points are selected for recording that are sufficiently different from all other previously recorded data points in the buffer. Since the buffer $\mathcal{B}$ is of finite dimension, the data is stored in a cyclic manner. As the number of data points reaches the buffer budget, a new data is added only upon one existing data point being removed such that the singular value of the buffer is maximized. The singular value maximization approach for the training data buffer update is provided in [35].

Reference will now be made to a certain Sample Complexity and Stability Analysis for DMRAC according to various embodiments. In this section, presented are certain sample complexity results, generalization error bounds and stability guarantee proof for DMRAC. It is shown that a DMRAC controller of various embodiments is characterized by the memory of the features learned over previously observed training data. It is further demonstrated in simulation that when a trained DMRAC according to various embodiments is used as a feed-forward network with frozen weights, it can still produce bounded tracking performance on reference tracking tasks that are related but reasonably different from those seen during network training. This property of DMRAC is ascribed to the very low generalization error bounds of the DNN. This property is proven herein in two steps. Firstly, the bound on the generalization error of DNN is proven using Lyapunov theory such that an asymptotic convergence in tracking error is achieved. Further, shown is information theoretically regarding the lower bound on the number of independent samples that are needed to train through before an assertion can be made that the DNN generalization error is well below a determined lower level given by Lyapunov analysis.

```
Algorithm 1 D-MRAC Controller Training

1:  Input: Γ, η, ζ_tol, p_max
 2:  while New measurements are available do
 3:      Update the D-MRGeN weights W using Eq:(10)
 4:      Compute y_{r+1} = Ŵ^T Φ(x_{r+1})
 5:      Given x_{r+1} compute γ_{r+1} by Eq-(19).
 6:      if γ_{r+1} ≥ ζ_tol then
 7:          Update 𝐵 : Z(:) = {x_{r+1}, y_{r+1}} and 𝕏 : Φ(x_{r+1})
 8:          if |𝐵| > p_max then
 9:              Delete element in 𝐵 by SVD maximization [35]
10:          end if
11:      end if
12:      if |𝐵| ≥ M then
13:          Sample a mini-batch of data Z^M ⊂ 𝐵
14:          Train the DNN network over mini-batch data using
             Eq-(2)
15:          Update the feature vector Φ for D-MRGeN network
16:      end if
17:  end while
```

Still referring to a certain Sample Complexity and Stability Analysis for DMRAC according to various embodiments, reference will now be made more particularly to Stability Analysis according to various embodiments. The generalization error of a machine learning model is defined as the difference between the empirical loss of the training set and the expected loss of test set [36]. This measure represents the ability of the trained model to generalize well from the learning data to new unseen data, thereby being able to extrapolate from training data to new test data. Hence generalization error can be defined as:

$$\hat{\Delta}(x) - f_\theta(x) \leq \epsilon \qquad (20)$$

Using the DMRAC (as frozen network) controller in (5) and using systems (3) the system dynamics can be written as $$\dot{x}(t) = Ax(t) + B(-Kx(t) + K_r r(t) - f_\theta(x(t)) + \Delta(x)) \qquad (21)$$

The above equation can be simplified as:

$$\dot{x}(t) = A_{rm}x(t) + B_{rm}r(t) + B(\Delta(x) - f_\theta(x(t))) \qquad (22)$$

Adding and subtracting the term $\Delta'(x)$ in the above expression and using the training and generalization error definitions the following can be written:

$$\dot{x}(t) = A_{rm}x(t) + B_{rm}r(t) + B(\Delta(x) - \Delta'(x(t)) + \Delta'(x(t)) - f_\theta(x(t))) \qquad (23)$$

The term $(\Delta(x)-\Delta'(x(t)))$ is the D-MRGeN training error and $(\Delta'(x(t))-f_\theta(x(t)))$ is the generalization error of the DMRAC DNN network. For simplicity of analysis it can be assumed that the training error is zero, this assumption is not very restrictive since training error can be made arbitrarily small by tuning network architecture and training epochs. The reference tracking error dynamics can be written as:

$$\dot{e}(t) = A_{rm}e(t) + \epsilon \qquad (24)$$

To analyze the asymptotic tracking performance of the error dynamics under DMRAC controller a Lyapunov candidate function can be defined as $V(e)=e^T Pe$ and its time derivative along the error dynamics (24) can be written as:

$$\dot{V}(e) = -e^T Q e + 2\epsilon Pe \tag{25}$$

where Q is solution for the Lyaunov equation $A_{rm}^T P + PA_{rm} = -Q$. To satisfy the condition $\dot{V}(e) < 0$ the following upper bound on generalization error is obtained:

$$\|\epsilon\| < \frac{\lambda_{max}(Q)\|e\|}{\lambda_{min}(P)} \tag{26}$$

The idea is, that if the DNN produces a generalization error lower than the specified bound (26), then Lyanpunov stability of the system under DMRAC controller can be said to have occured.

Still referring to a certain Sample Complexity and Stability Analysis for DMRAC according to various embodiments, reference will now be made more particularly to Sample Complexity of DMRAC according to various embodiments.

In this section, studied will be the sample complexity results from computational theory and it will be shown that when applied to network learning real-valued functions the number of training samples grows at least linearly with the number of tunable parameters to achieve specified generalization error.

Theorem 2: Suppose a neural network with arbitrary activation functions and an output that takes values in $[-1,1]$. Let $\mathcal{H}$ be the hypothesis class characterized by N-weights and each weight represented using k-bits. Then any squared error minimization (SEM) algorithm $\mathcal{A}$ over $\mathcal{H}$, to achieve a generalization error (26) admits a sample complexity bounded as follows:

$$m_{\mathcal{A}}(\epsilon, \delta) \leq \frac{1}{\epsilon^2}\left(kN \ln 2 + \ln\left(\frac{2}{\delta}\right)\right) \tag{27}$$

where N is total number of tunable weights in the DNN.

Proof: Let $\mathcal{H}$ be finite hypothesis class of function mapping s.t: $\mathcal{H}: \mathcal{X} \rightarrow [-1, 1] \in \mathbb{R}^m$ and $\mathcal{A}$ is SEM algorithm for $\mathcal{H}$. Then by Hoeffding inequality for any fixed $f_\theta \in \mathcal{H}$ the following event holds with a small probability $\delta$ $$P^m\{|L(Z, \theta) - \mathbb{E}_P(\ell(\mid Z, \theta))| \geq \epsilon\} = \tag{28}$$

$$P^m\left\{\left|\sum_{i=1}^m \ell(Z, \theta) - m\mathbb{E}_P(\ell(Z, \theta))\right| \geq m\epsilon\right\} \leq \tag{29}$$

$$2e^{-\epsilon^2 m/2} \tag{30}$$

Hence $$P^m\{\forall f_\theta \in \mathcal{H}, \|L(Z, \theta) - \mathbb{E}_P(\ell(Z, \theta))\| \geq \epsilon\} \leq 2|\mathcal{H}|e^{-\epsilon^2 m/2} = \delta \tag{31}$$

It is noted that the total number of possible states that is assigned to the weights is $(2^k)^N$ since there are $2^k$ possibilities for each weights. Therefore $\mathcal{H}$ is finite and $|\mathcal{H}| \leq 2^{kN}$. The result follows immediately from simplifying Eq-(31).

Figure 2A:
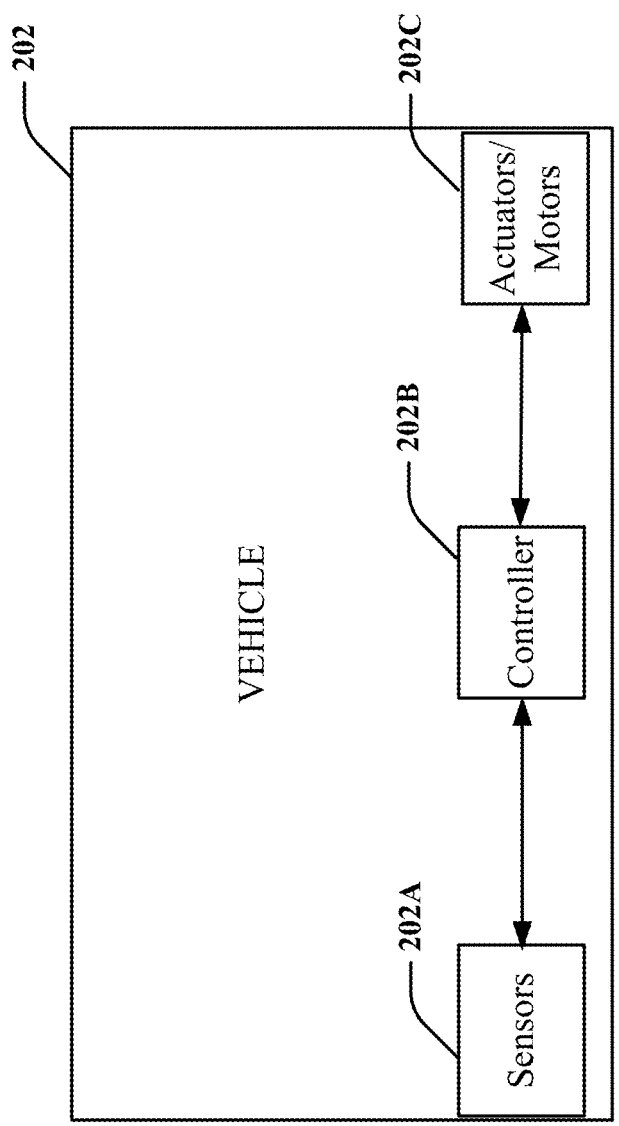
FIG. 2A is a block diagram illustrating an example, non-limiting embodiment of a vehicle utilizing a controller in accordance with various aspects described herein.

Referring now to FIG. 2A, this is a block diagram illustrating an example, non-limiting embodiment of a vehicle 202 utilizing a controller 202B in accordance with various aspects described herein. The vehicle 202 can be a flying vehicle (e.g., drone), a land vehicle (e.g., a wheeled or tracked vehicle), or any other desired type of vehicle. The vehicle 202 can have one or more actuators/motors 202C (which can be used for propulsion and/or for control of velocity and/or for control of acceleration and/or for control of direction and/or for control of orientation). In addition, the vehicle 202 can have one or more sensors 202A for obtaining data (such as data relating to vehicle velocity and/or vehicle acceleration and/or vehicle direction and/or vehicle orientation and/or vehicle location). The controller 202B can comprise, for example, some or all of the apparatus 100 of FIG. 1. The controller 202B can be in bi-directional communication with each of sensors 202A and can be in bi-directional communication with each of actuators/motors 202C. The controller 202B can operate to receive signals from sensors 202A and to cause actuators/motors 202C to control the vehicle 202 (e.g., to control vehicle velocity and/or to control vehicle acceleration and/or to control vehicle direction and/or to control vehicle orientation and/or to control vehicle location).

Figure 2B:
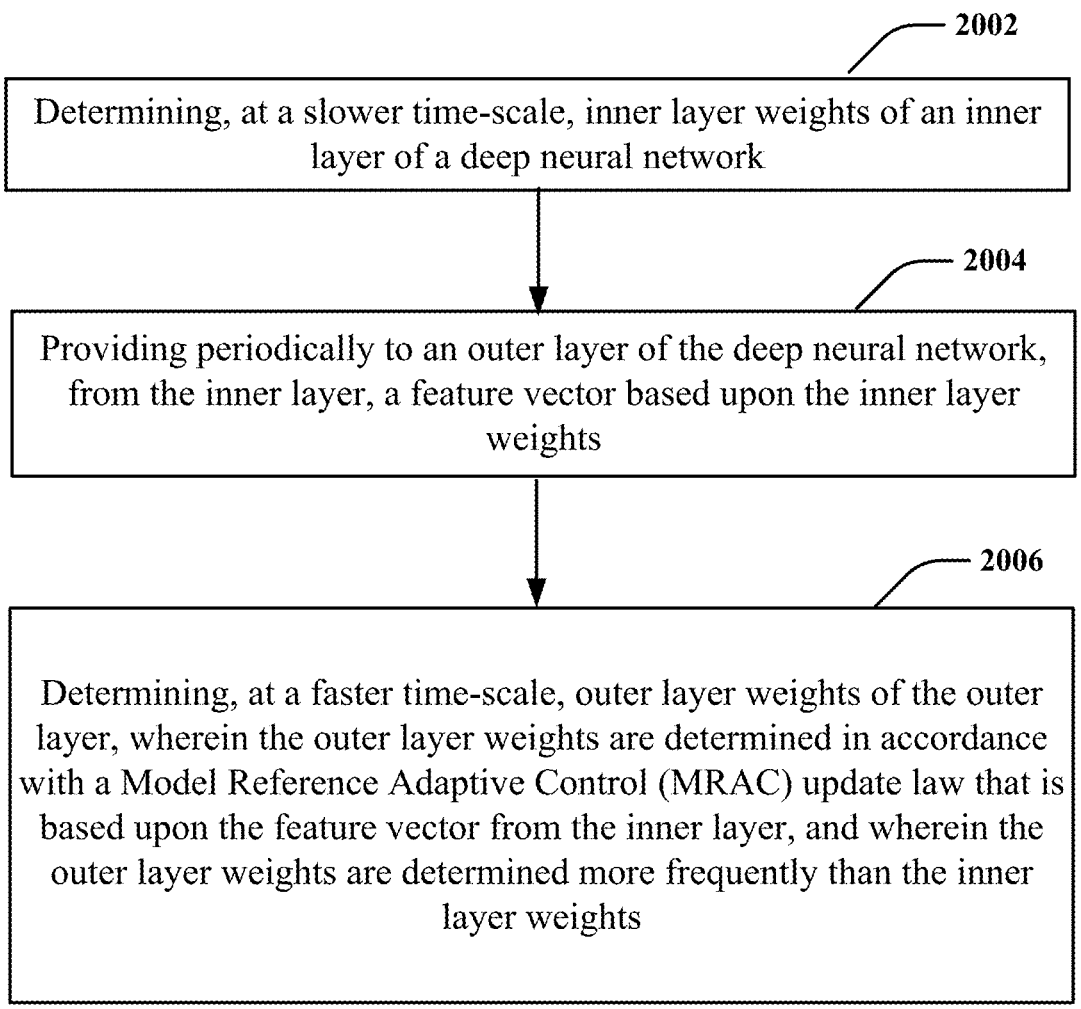
FIG. 2B depicts an illustrative embodiment of a method in accordance with various aspects described herein.

Referring now to FIG. 2B, various steps of a method 2000 according to an embodiment are shown. As seen in this FIG. 2B, step 2002 comprises determining, at a slower time-scale, inner layer weights of an inner layer of a deep neural network. Next, step 2004 comprises providing periodically to an outer layer of the deep neural network, from the inner layer, a feature vector based upon the inner layer weights. Next, step 2006 comprises determining, at a faster time-scale, outer layer weights of the outer layer, wherein the outer layer weights are determined in accordance with a Model Reference Adaptive Control (MRAC) update law that is based upon the feature vector from the inner layer, and wherein the outer layer weights are determined more frequently than the inner layer weights.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
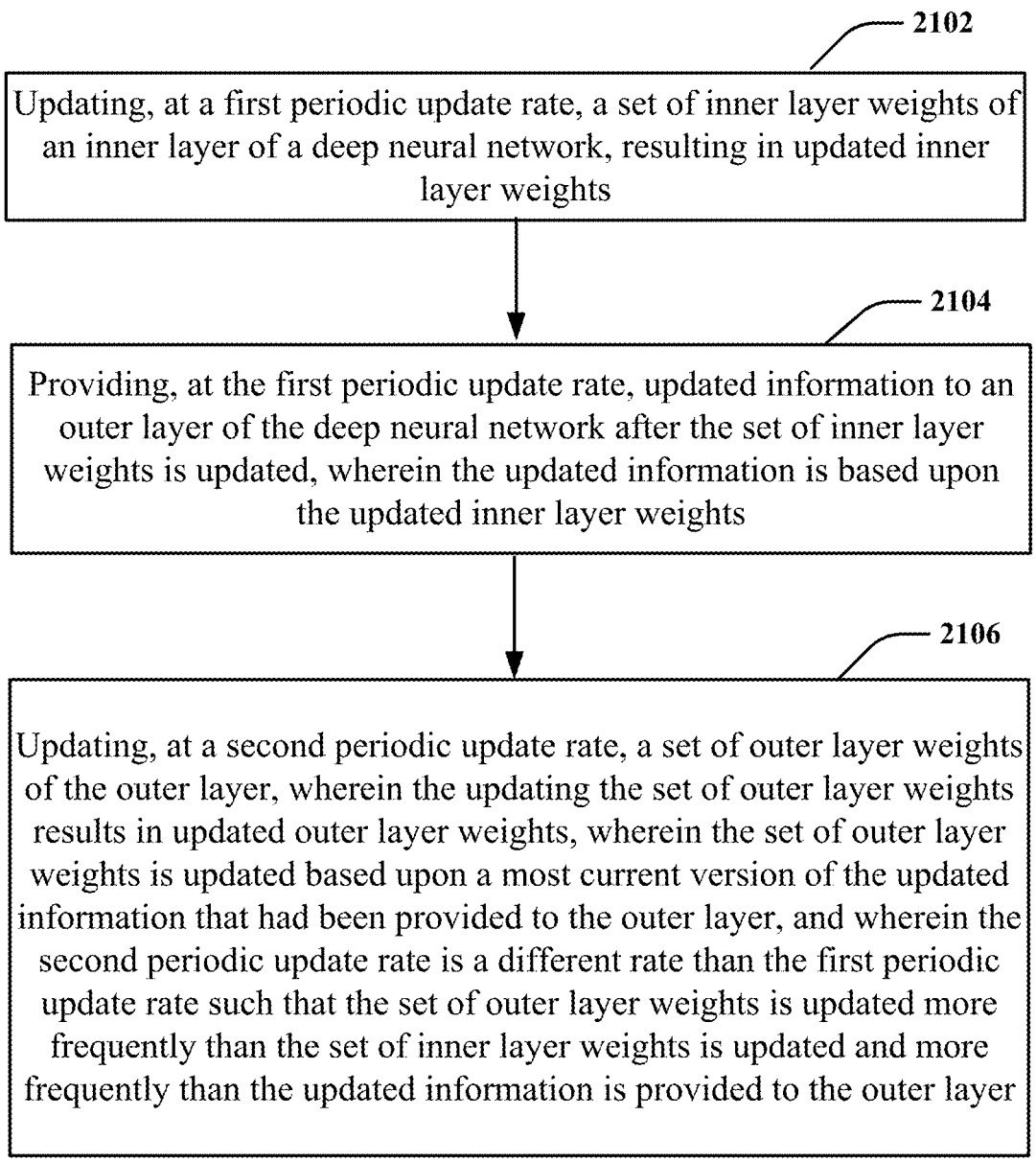
FIG. 2C depicts an illustrative embodiment of a method in accordance with various aspects described herein.

Referring now to FIG. 2C, various steps of a method 2100 according to an embodiment are shown. As seen in this FIG. 2C, step 2102 comprises updating, at a first periodic update rate, a set of inner layer weights of an inner layer of a deep neural network, resulting in updated inner layer weights. Next, step 2104 comprises providing, at the first periodic update rate, updated information to an outer layer of the deep neural network after the set of inner layer weights is updated, wherein the updated information is based upon the updated inner layer weights. Next, step 2106 comprises updating, at a second periodic update rate, a set of outer layer weights of the outer layer, wherein the updating the set of outer layer weights results in updated outer layer weights, wherein the set of outer layer weights is updated based upon a most current version of the updated information that had been provided to the outer layer, and wherein the second periodic update rate is a different rate than the first periodic update rate such that the set of outer layer weights is updated more frequently than the set of inner layer weights is updated and more frequently than the updated information is provided to the outer layer.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
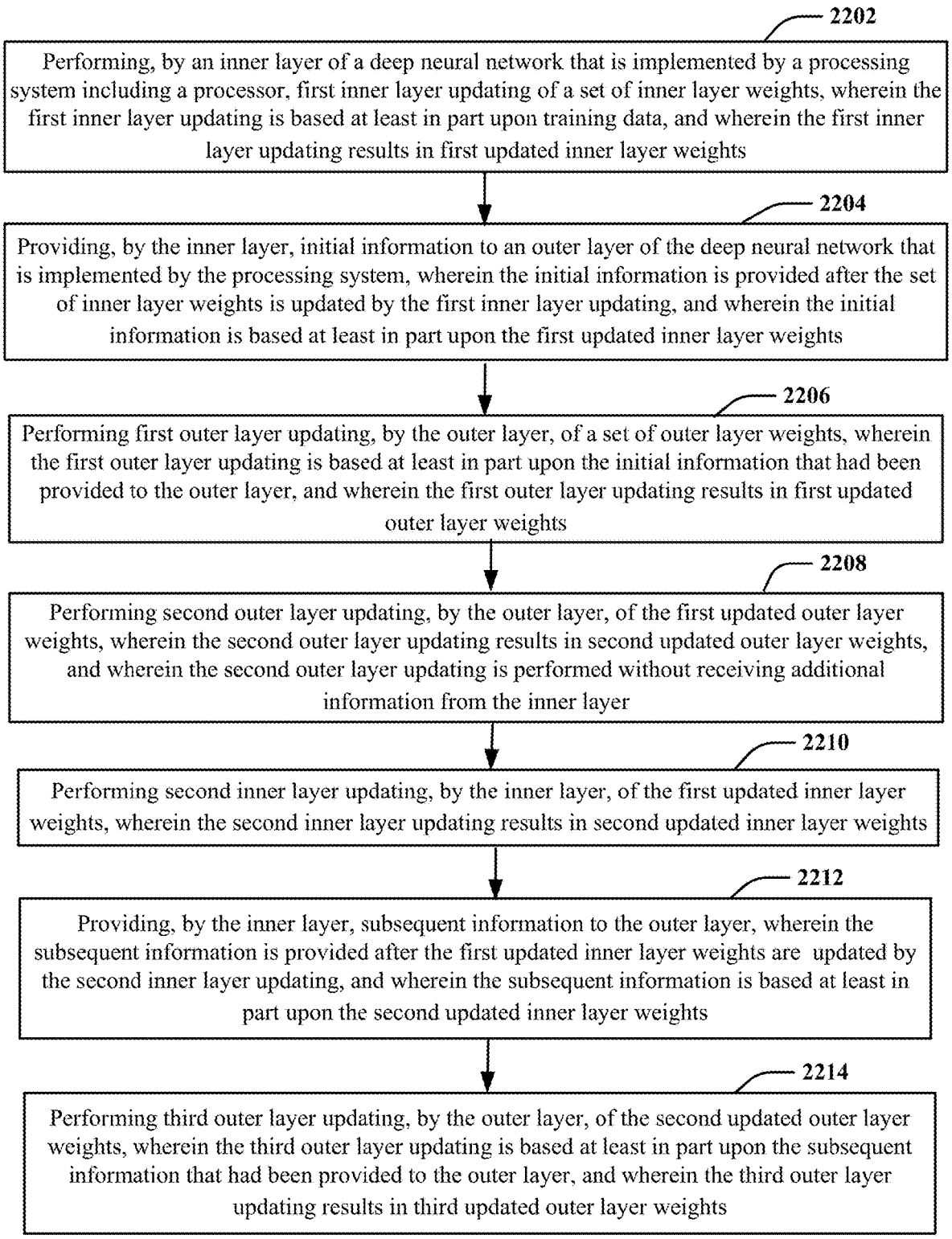
FIG. 2D depicts an illustrative embodiment of a method in accordance with various aspects described herein.

Referring now to FIG. 2D, various steps of a method 2200 according to an embodiment are shown. As seen in this FIG. 2D, step 2202 comprises performing, by an inner layer of a deep neural network that is implemented by a processing system including a processor, first inner layer updating of a set of inner layer weights, wherein the first inner layer updating is based at least in part upon training data, and wherein the first inner layer updating results in first updated inner layer weights. Next, step 2204 comprises providing, by the inner layer, initial information to an outer layer of the deep neural network that is implemented by the processing system, wherein the initial information is provided after the set of inner layer weights is updated by the first inner layer updating, and wherein the initial information is based at least in part upon the first updated inner layer weights. Next, step 2206 comprises performing first outer layer updating, by the outer layer, of a set of outer layer weights, wherein the first outer layer updating is based at least in part upon the initial information that had been provided to the outer layer, and wherein the first outer layer updating results in first updated outer layer weights. Next, step 2208 comprises performing second outer layer updating, by the outer layer, of the first updated outer layer weights, wherein the second outer layer updating results in second updated outer layer weights, and wherein the second outer layer updating is performed without receiving additional information from the inner layer. Next, step 2210 comprises performing second inner layer updating, by the inner layer, of the first updated inner layer weights, wherein the second inner layer updating results in second updated inner layer weights. Next, step 2212 comprises providing, by the inner layer, subsequent information to the outer layer, wherein the subsequent information is provided after the first updated inner layer weights are updated by the second inner layer updating, and wherein the subsequent information is based at least in part upon the second updated inner layer weights. Next, step 2214 comprises performing third outer layer updating, by the outer layer, of the second updated outer layer weights, wherein the third outer layer updating is based at least in part upon the subsequent information that had been provided to the outer layer, and wherein the third outer layer updating results in third updated outer layer weights.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Reference will now be made to certain Simulations according to various embodiments. In this section, an evaluation is made of the presented DMRAC adaptive controller (according to an embodiment) using a 6-DOF Quadrotor model for the reference trajectory tracking problem. The quadrotor model is completely described by 12 states, three position, and velocity in the North-East-Down reference frame and three body angles and angular velocities. A full description of the dynamic behavior of a Quadrotor can be found in [37] and references therein.

The control law designed treats the moments and forces on the vehicle due to unknown true inertia/mass of the vehicle and moments due to aerodynamic forces of the crosswind, as the unmodeled uncertainty terms and are captured online through DNN adaptive element. The outer-loop control of the quadrotor is achieved through Dynamic Inversion (DI) controller, and a DMRAC according to an embodiment is used for the inner-loop attitude control. A simple wind model with a boundary layer effect is used to simulate the effect of crosswind on the vehicle.

A second-order reference model with natural frequency 4 rad/s and damping ratio of 0.5 is used. Further, stochasticity is added to the system by adding Gaussian white noise to the states with a variance of $\omega_n$=0.01. The simulation runs for 150 secs and uses time step of 0.05 The maximum number of points ($P_{max}$) to be stored in buffer $\mathcal{B}$ is arbitrarily set to 250, and SVD maximization algorithm is used to cyclically update $\mathcal{B}$ when the budget is reached, for details refer to [35].

The controller of this example is designed to track stable reference commands r(t). The goal of the experiment is to evaluate the tracking performance of the DMRAC controller according to an embodiment on the system with uncertainties over an unknown domain of operation. The learning rate for D-MRGEN network and DMRAC-DNN networks are chosen to be $\Gamma=0.5I_{6\times6}$ and $\eta$=0.01 The DNN network is composed of 2 hidden layers with 200, 100 neurons and with tan-sigmoid activations, and output layer with linear activation. "Levenberg-Marquardt backpropagation" [38] is used for updating DNN weights over 100 epochs. Tolerance threshold for kernel independence test is selected to be $\zeta tol$=0.2 for updating the buffer $\mathcal{B}$.

Figure 2E:
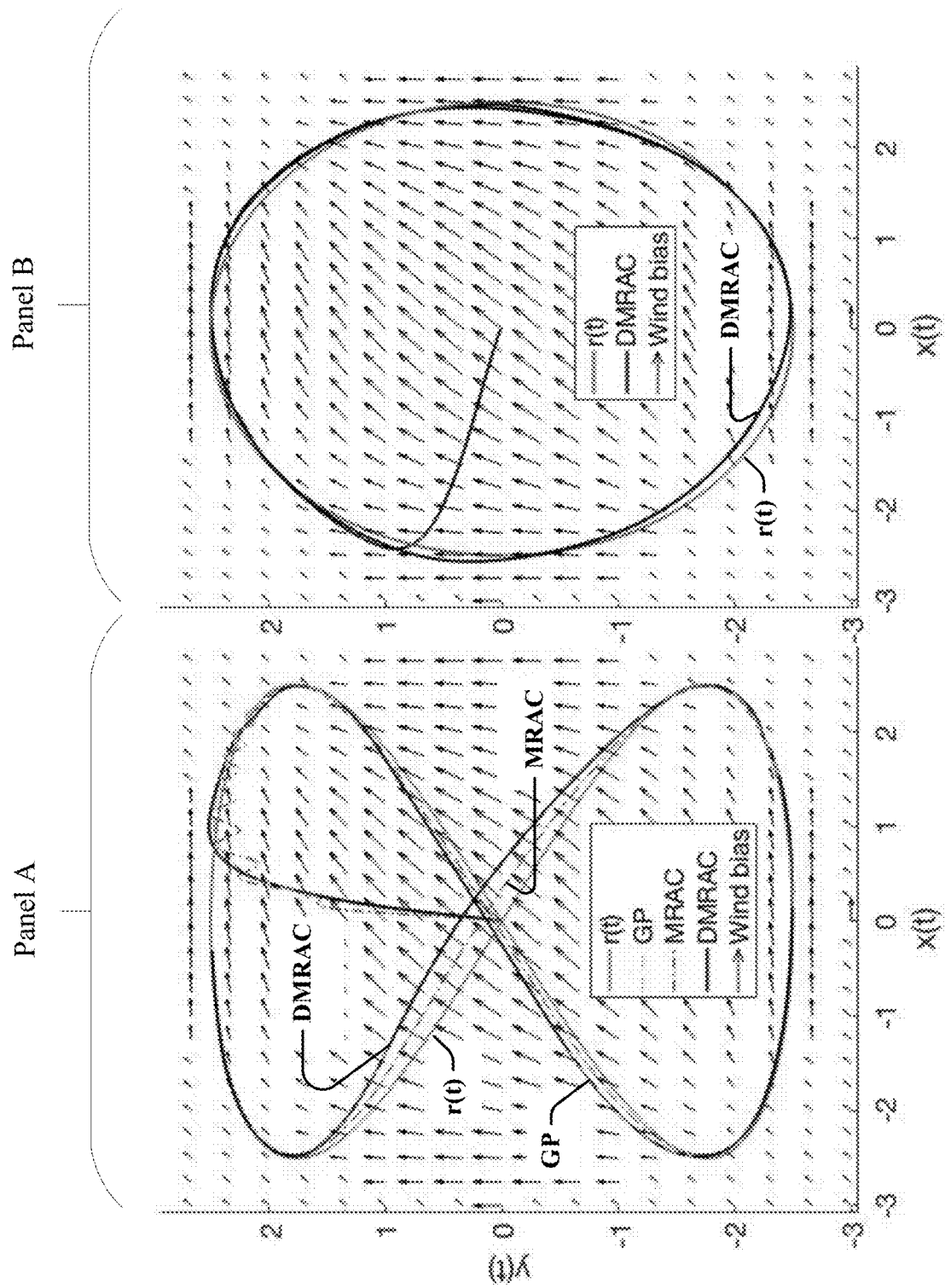
FIG. 2E depicts examples of DMRAC Controller Evaluation (according to an embodiment) on 6 DOF (degree of freedom) Quadrotor dynamics model. More particularly, Panel A depicts DMRAC (according to an embodiment) vs MRAC vs GP-MRAC Controllers on quadrotor trajectory tracking with active learning. Panel B depicts DMRAC (according to an embodiment) as frozen feed-forward network (Circular Trajectory) to test network generalization.
Figure 2F:
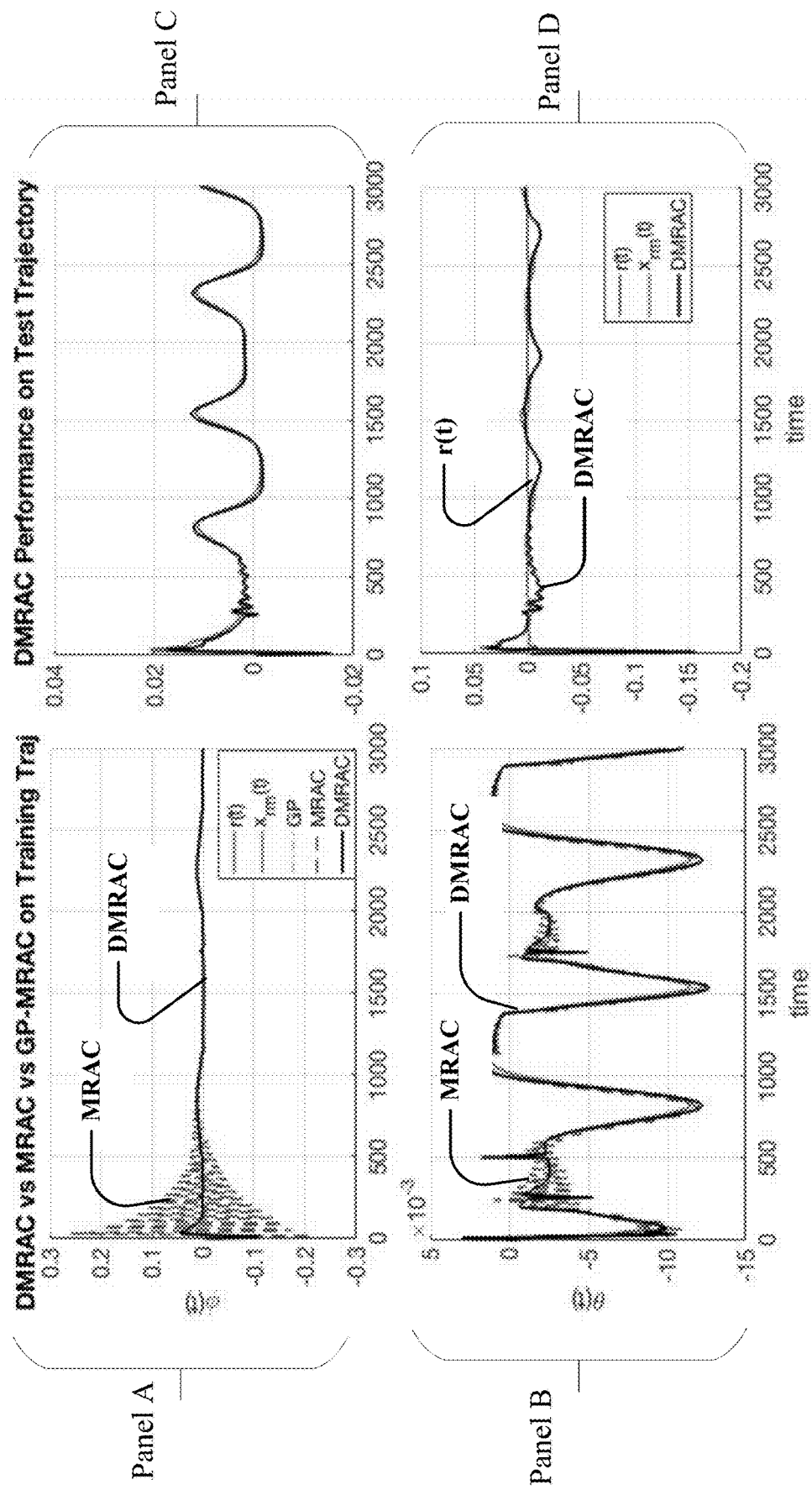
FIG. 2F depicts examples of DMRAC Controller Evaluation (according to an embodiment) on 6 DOF (degree of freedom) Quadrotor dynamics model. More particularly, Panels A-B depict closed-loop system response in roll rate $\phi(t)$ and Pitch $\theta(t)$ and Panels C-D depict DMRAC performance (according to an embodiment) on Test Trajectory.
Figure 2G:
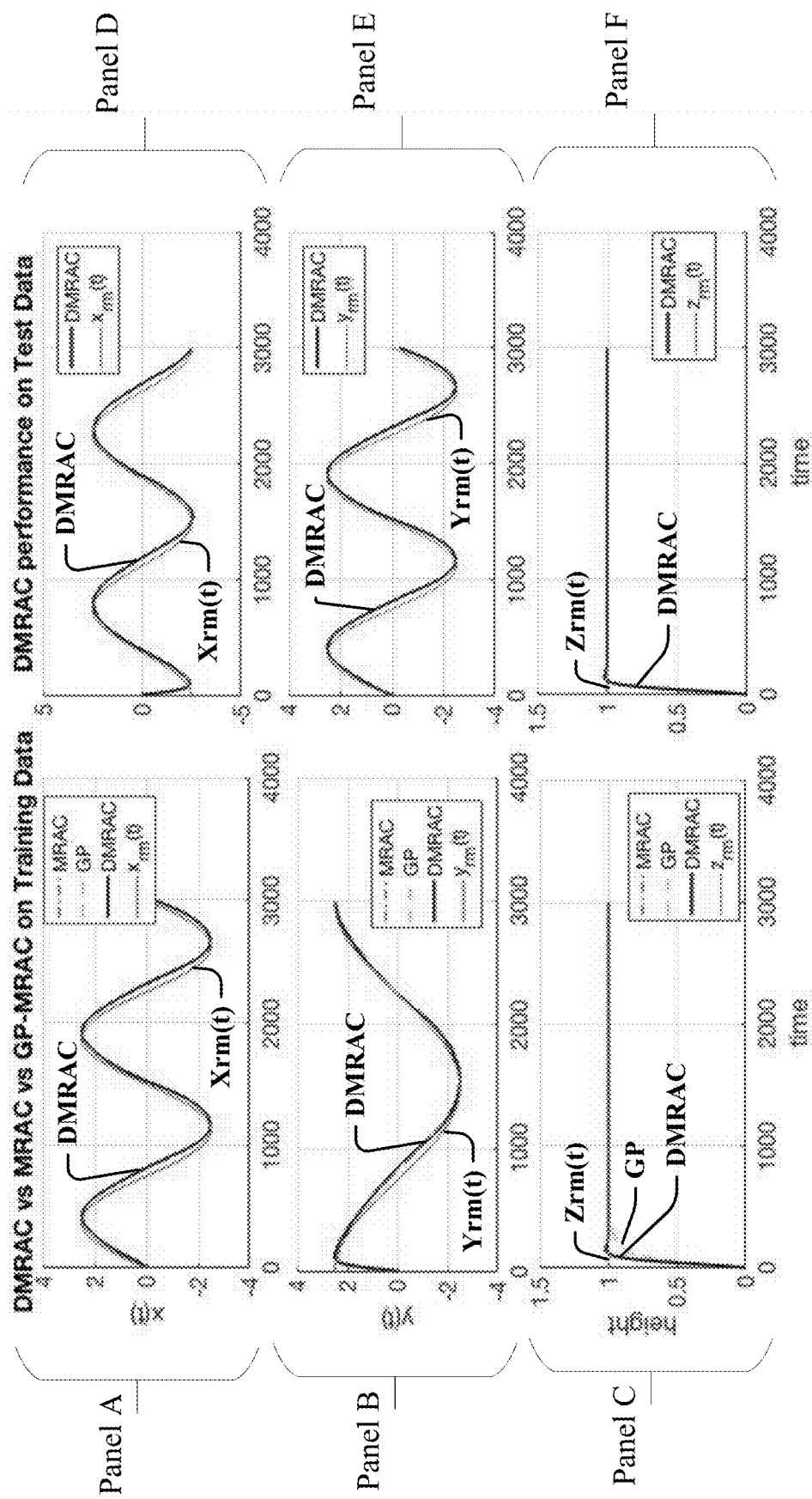
FIG. 2G depicts examples (see Panels A-C) of Position Tracking performance of DMRAC (according to an embodiment) vs MRAC vs GP-MRAC controller with active learning and (see Panels D-F) Learning retention test over Circular Trajectory for DMRAC (according to an embodiment).
Figure 2H:
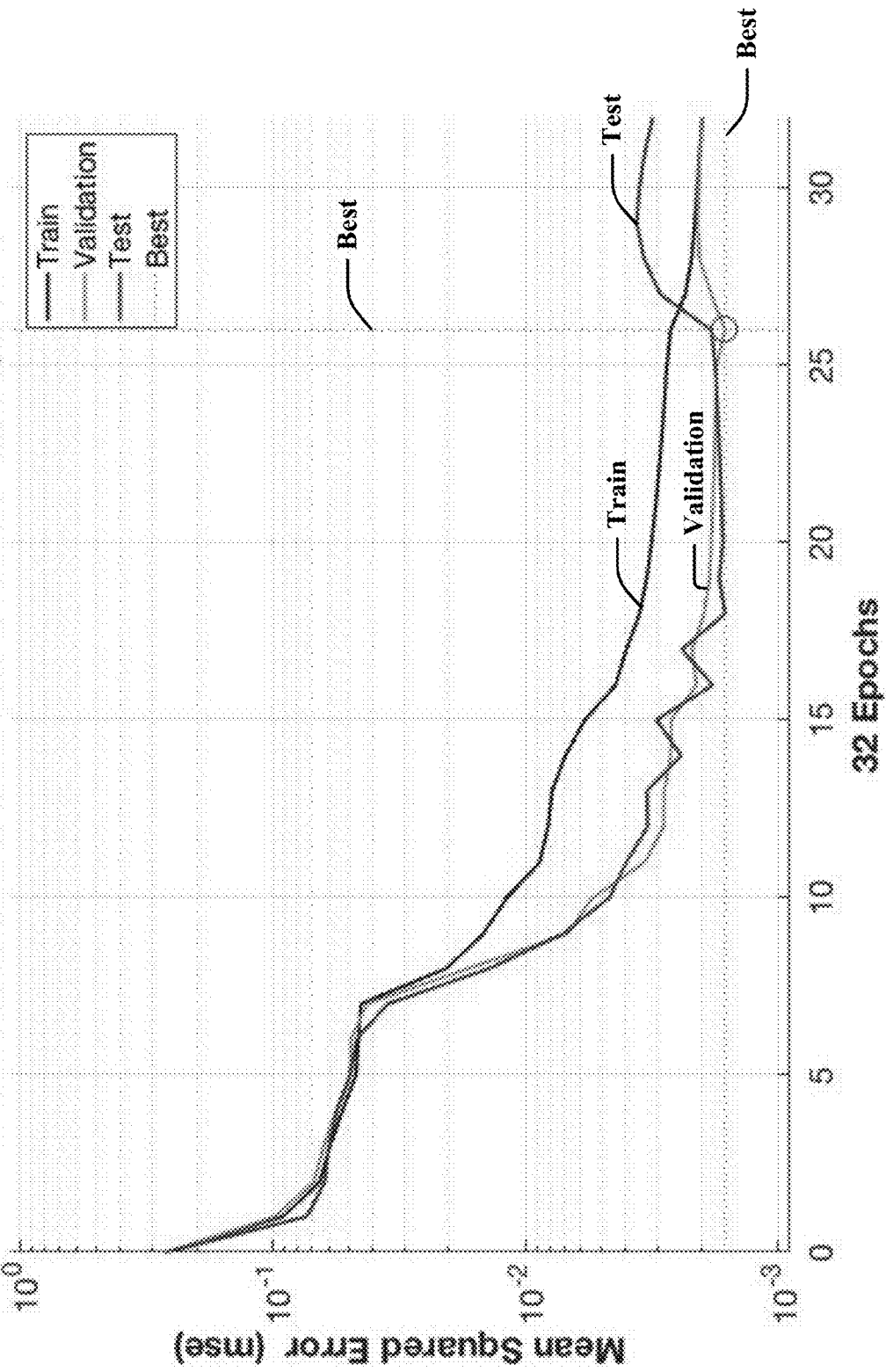
FIG. 2H depicts examples (according to an embodiment) of DNN Training, Test and Validation performance.

FIGS. 2E-2F show the closed loop system performance in tracking the reference signal for DMRAC controller (according to an embodiment) and learning retention when used as the feed-forward network on a similar trajectory (Circular) with no learning. It is demonstrated that the DMRAC controller under uncertainty and without domain information is successful in producing desired reference tracking. Since DMRAC, unlike traditional MRAC, uses DNN for uncertainty estimation it is hence capable of retaining the past learning and thereby can be used in tasks with similar features without active online adaptation (FIG. 2F). Whereas traditional MRAC which is a "pointwise in time" learning algorithm and cannot generalize across tasks. The DMRAC controller (according to an embodiment) achieves tighter tracking with smaller tracking error in both outer and inner loop states as shown in FIG. 2F and FIG. 2G both with adaptation and as a feed-forward adaptive network without adaptation. FIG. 2H demonstrates (according to an embodiment) the DNN learning performance vs epochs. The Training, Testing and Validation error over the data buffer for DNN, demonstrate the network performance in learning a model of the system uncertainties and its generalization capabilities over unseen test data.

As described herein, presented (according to various embodiments) is a DMRAC adaptive controller using model reference generative network architecture to address the issue of feature design in unstructured uncertainty. The controller can use DNN to model significant uncertainties without knowledge of the system's domain of operation. Provided herein are theoretical proofs of the controller generalizing capability over unseen data points and boundedness properties of the tracking error. Numerical simulations with 6-DOF quadrotor model demonstrate the controller performance, in achieving reference model tracking in the presence of significant matched uncertainties and also learning retention when used as a feed-forward adaptive network on similar but unseen new tasks. Thereby, various embodiments of DMRAC provide a highly powerful architecture for high performance control of nonlinear systems with robustness and long-term learning properties.

As described herein, various embodiments can provide a control system architecture that utilizes deep neural networks to control flying drones (e.g., quadcopters) and/or ground-based robots (e.g., wheeled robots or tracked robots).

As described herein, various embodiments can provide mechanisms for controlling robotic vehicles and increasing their autonomy.

As described herein, various embodiments can provide mechanisms for controlling automobiles and/or construction equipment.

As described herein, various embodiments can provide an adaptive controller that uses deep neural networks to model significant uncertainties without knowledge of a system's domain of operation.

As described herein, various embodiments can provide an adaptive controller that can be implemented without the need for configuration.

As described herein, various embodiments can provide an adaptive controller that can be implemented without the need to be fed training data.

As described herein, various embodiments can provide a deep neural network utilizing an algorithm to create an advanced fault-tolerant controller for autonomous vehicles. The algorithm can enable an autonomous vehicle to be controlled without having to teach the algorithm prior to controlling the autonomous vehicle. The controller can also provide for stability of an autonomous vehicle despite certain faults or malfunctions with the vehicle.

As described herein, various embodiments can provide a deep learning algorithm that can be independent of an autonomous vehicle.

As described herein, various embodiments can provide a deep learning algorithm that can operate without the need of initial test/training data.

As described herein, various embodiments can provide an algorithm utilizing deep neural networks to implement real-time adaptive feedback for autonomous vehicles. In various examples, the algorithm can be implemented on any autonomous vehicle and can be able to operate the autonomous vehicle (e.g., without having been fed training data about the autonomous vehicle). In another example, the vehicle being operated and the algorithm can be independent. In another example, the algorithm can be implemented on a vehicle in order to operate the vehicle. In one specific example, in the first 100 or so seconds, the algorithm can use sensors on the vehicle to collect data and learn using batch data (wherein the algorithm will then be able to stabilize control of the vehicle). In another example, the algorithm has a memory (and/or has access to a memory) from which the algorithm is able to learn. In another example, the algorithm is able to learn new commands (e.g., inputs were given by a human operator to fly a quadcopter in a circle; the algorithm can then utilize this information to then fly the quadcopter in a "figure 8").

As described herein, various embodiments can provide a guarantee of stability from start, without any training data.

As described herein, various embodiments can operate without a lot of training data.

As described herein, various embodiments can provide an algorithm that can generalize.

As described herein, various embodiments can provide an algorithm that can learn online.

As described herein, various embodiments can provide an algorithm in which no tuning is required.

As described herein, various embodiments can provide for online updates, which provide updating of the Deep Neural Network on the go (unlike certain conventional Deep Neural Networks which are typically updated offline).

As described herein, one or more estimates of uncertainty can be determined and/or provided to arrive at every time interval of a periodic iteration.

In various embodiments, a reference signal (or reference command) can be commanded desired behavior that a system needs to track (e.g., in the context of an aircraft a reference signal (or reference command) can be pilot stick command). In various embodiments, a reference signal (or reference command), e.g., a user reference signal, can pass through a reference model which serves as a low pass filter. In various embodiments, filter output can be used as tracking signal(s) in DMRAC.

In various embodiments, model predictive control (MPC) planning can be used (such as in the absence of a pilot) to generate reference signa(s) (or reference command(s)) for DMRAC. Such model predictive control can comprise conventional, piece wise optimal controllers that are typically used for planning.

In another embodiment, a method comprises: determining, at a first time-scale, one or more inner layer weights of an inner layer of a deep neural network; providing to an outer layer of the deep neural network from the inner layer, at the first time-scale, one or more feature vectors based at least in part upon the one or more inner layer weights; determining, at a second time-scale, one or more outer layer weights of the outer layer, wherein the one or more outer layer weights are determined based at least in part upon the one or more feature vectors from the inner layer, and wherein the second time-scale is a different time-scale than the first time-scale such that the one or more outer layer weights are determined more frequently than the one or more inner layer weights.

In another embodiment, a method comprises: updating, at a first periodic update rate, a set of one or more inner layer weights of an inner layer of a deep neural network, resulting in one or more updated inner layer weights; providing, at the first periodic update rate, updated information to an outer layer of the deep neural network after the set of one or more inner layer weights is updated, wherein the updated information is based at least in part upon the one or more updated inner layer weights; updating, at a second periodic update rate, a set of one or more outer layer weights of the outer layer, wherein the updating the set of one or more outer layer weights results in an updated set of one or more outer layer weights, wherein the set of one or more outer layer weights is updated based at least in part upon a most current version of the updated information that had been provided to the outer layer, and wherein the second periodic update rate is a different rate than the first periodic update rate such that the set of one or more outer layer weights is updated more frequently than the set of one or more inner layer weights is updated and more frequently than the updated information is provided to the outer layer.

In another embodiment, a method comprises: performing, by an inner layer of a deep neural network that is implemented by a processing system including a processor, first inner layer updating of a set of one or more inner layer weights, wherein the first inner layer updating is based at least in part upon training data, and wherein the first inner layer updating results in one or more first updated inner layer weights; providing, by the inner layer, initial information to an outer layer of the deep neural network that is implemented by the processing system, wherein the initial information is provided after the set of one or more inner layer weights is updated by the first inner layer updating, and wherein the initial information is based at least in part upon the one or more first updated inner layer weights; performing first outer layer updating, by the outer layer, of a set of one or more outer layer weights, wherein the first outer layer updating is based at least in part upon the initial information that had been provided to the outer layer, and wherein the first outer layer updating results in one or more first updated outer layer weights; performing second outer layer updating, by the outer layer, of the one or more first updated outer layer weights, wherein the second outer layer updating results in one or more second updated outer layer weights, and wherein the second outer layer updating is performed without receiving additional information from the inner layer; performing second inner layer updating, by the inner layer, of the one or more first updated inner layer weights, wherein the second inner layer updating results in one or more second updated inner layer weights; providing, by the inner layer, subsequent information to the outer layer, wherein the subsequent information is provided after the one or more first updated inner layer weights are updated by the second inner layer updating, and wherein the subsequent information is based at least in part upon the one or more second updated inner layer weights; and performing third outer layer updating, by the outer layer, of the one or more second updated outer layer weights, wherein the third outer layer updating is based at least in part upon the subsequent information that had been provided to the outer layer, and wherein the third outer layer updating results in one or more third updated outer layer weights.

Figure 3:
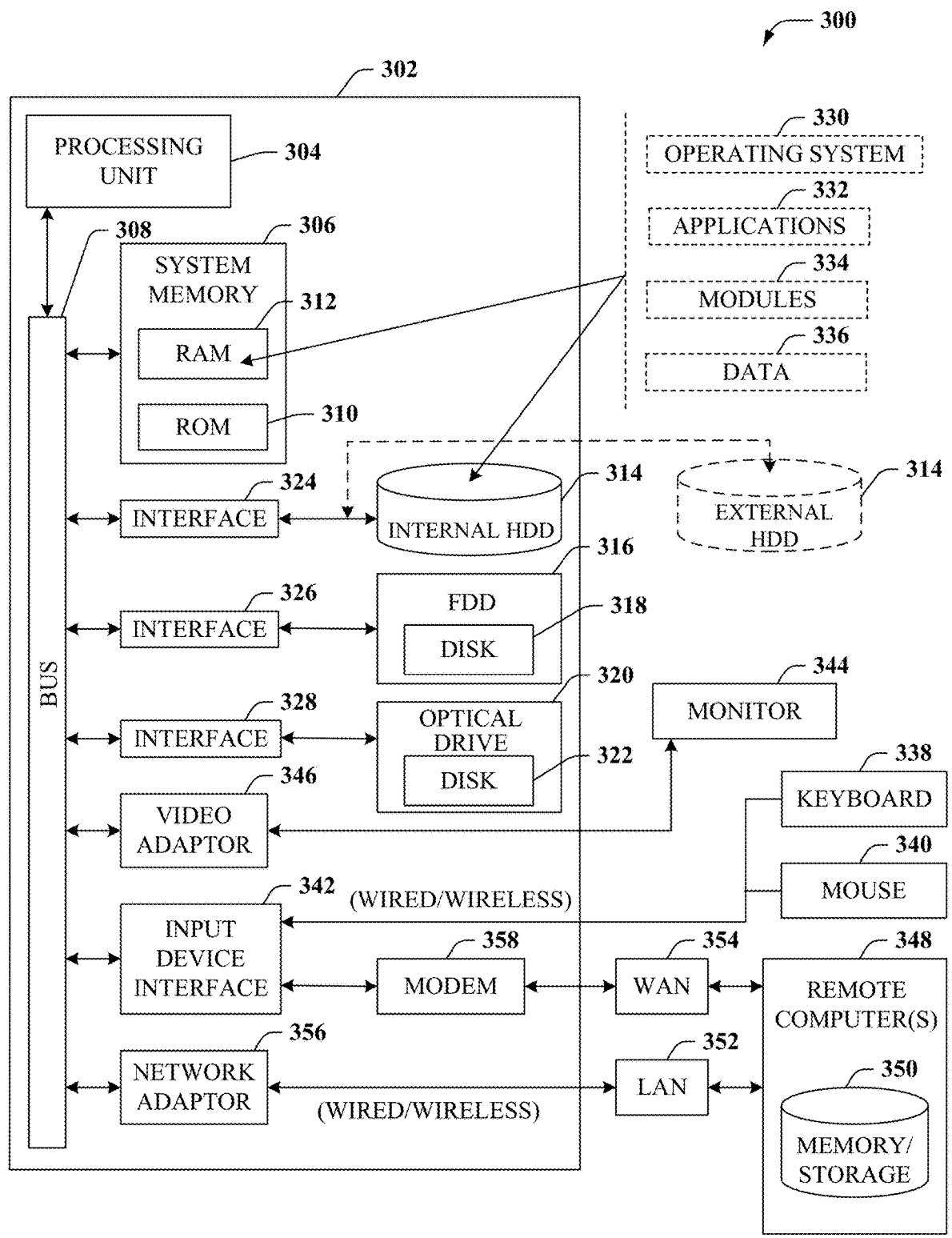
FIG. 3 is a block diagram of an example, non-limiting embodiment of a computing environment in accordance with various aspects described herein.

Turning now to FIG. 3, there is illustrated a block diagram of a computing environment in accordance with various aspects described herein. In order to provide additional context for various embodiments of the embodiments described herein, FIG. 3 and the following discussion are intended to provide a brief, general description of a suitable computing environment 300 in which the various embodiments of the subject disclosure can be implemented. Various embodiments can be implemented via computer-executable instructions that can run on one or more computers, and/or in combination with other program modules and/or as a combination of hardware and software. For example, computing environment 300 can facilitate in whole or in part a vehicle control architecture that utilizes an inner layer of a deep neural network and an outer layer of the deep neural network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 3, the example environment can comprise a computer 302, the computer 302 comprising a processing unit 304, a system memory 306 and a system bus 308. The system bus 308 couples system components including, but not limited to, the system memory 306 to the processing unit 304. The processing unit 304 can be any of various commercially available processors. Dual microprocessors and other multiprocessor architectures can also be employed as the processing unit 304.

The system bus 308 can be any of several types of bus structure that can further interconnect to a memory bus (with or without a memory controller), a peripheral bus, and a local bus using any of a variety of commercially available bus architectures. The system memory 306 comprises ROM 310 and RAM 312. A basic input/output system (BIOS) can be stored in a non-volatile memory such as ROM, erasable programmable read only memory (EPROM), EEPROM, which BIOS contains the basic routines that help to transfer information between elements within the computer 302, such as during startup. The RAM 312 can also comprise a high-speed RAM such as static RAM for caching data.

The computer 302 further comprises an internal hard disk drive (HDD) 314 (e.g., EIDE, SATA), which internal HDD 314 can also be configured for external use in a suitable chassis (not shown), a magnetic floppy disk drive (FDD) 316, (e.g., to read from or write to a removable diskette 318) and an optical disk drive 320, (e.g., reading a CD-ROM disk 322 or, to read from or write to other high capacity optical media such as the DVD). The HDD 314, magnetic FDD 316 and optical disk drive 320 can be connected to the system bus 308 by a hard disk drive interface 324, a magnetic disk drive interface 326 and an optical drive interface 328, respectively. The hard disk drive interface 324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 312, comprising an operating system 330, one or more application programs 332, other program modules 334 and program data 336. All or portions of the operating system, applications, modules, and/or data can also be cached in the RAM 312. The systems and methods described herein can be implemented utilizing various commercially available operating systems or combinations of operating systems.

A user can enter commands and information into the computer 302 through one or more wired/wireless input devices, e.g., a keyboard 338 and a pointing device, such as a mouse 340. Other input devices (not shown) can comprise a microphone, an infrared (IR) remote control, a joystick, a game pad, a stylus pen, touch screen or the like. These and other input devices are often connected to the processing unit 304 through an input device interface 342 that can be coupled to the system bus 308, but can be connected by other interfaces, such as a parallel port, an IEEE 1394 serial port, a game port, a universal serial bus (USB) port, an IR interface, etc.

A monitor 344 or other type of display device can be also connected to the system bus 308 via an interface, such as a video adapter 346. It will also be appreciated that in alternative embodiments, a monitor 344 can also be any display device (e.g., another computer having a display, a smart phone, a tablet computer, etc.) for receiving display information associated with computer 302 via any communication means, including via the Internet and cloud-based networks. In addition to the monitor 344, a computer typically comprises other peripheral output devices (not shown), such as speakers, printers, etc.

The computer 302 can operate in a networked environment using logical connections via wired and/or wireless communications to one or more remote computers, such as a remote computer(s) 348. The remote computer(s) 348 can be a workstation, a server computer, a router, a personal computer, portable computer, microprocessor-based entertainment appliance, a peer device or other common network node, and typically comprises many or all of the elements described relative to the computer 302, although, for purposes of brevity, only a remote memory/storage device 350 is illustrated. The logical connections depicted comprise wired/wireless connectivity to a local area network (LAN) 352 and/or larger networks, e.g., a wide area network (WAN) 354. Such LAN and WAN networking environments are commonplace in offices and companies, and facilitate enterprise-wide computer networks, such as intranets, all of which can connect to a global communications network, e.g., the Internet.

When used in a LAN networking environment, the computer 302 can be connected to the LAN 352 through a wired and/or wireless communication network interface or adapter 356. The adapter 356 can facilitate wired or wireless communication to the LAN 352, which can also comprise a wireless AP disposed thereon for communicating with the adapter 356.

When used in a WAN networking environment, the computer 302 can comprise a modem 358 or can be connected to a communications server on the WAN 354 or has other means for establishing communications over the WAN 354, such as by way of the Internet. The modem 358, which can be internal or external and a wired or wireless device, can be connected to the system bus 308 via the input device interface 342. In a networked environment, program modules depicted relative to the computer 302 or portions thereof, can be stored in the remote memory/storage device 350. It will be appreciated that the network connections shown are example and other means of establishing a communications link between the computers can be used.

The computer 302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from various locations, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 4:
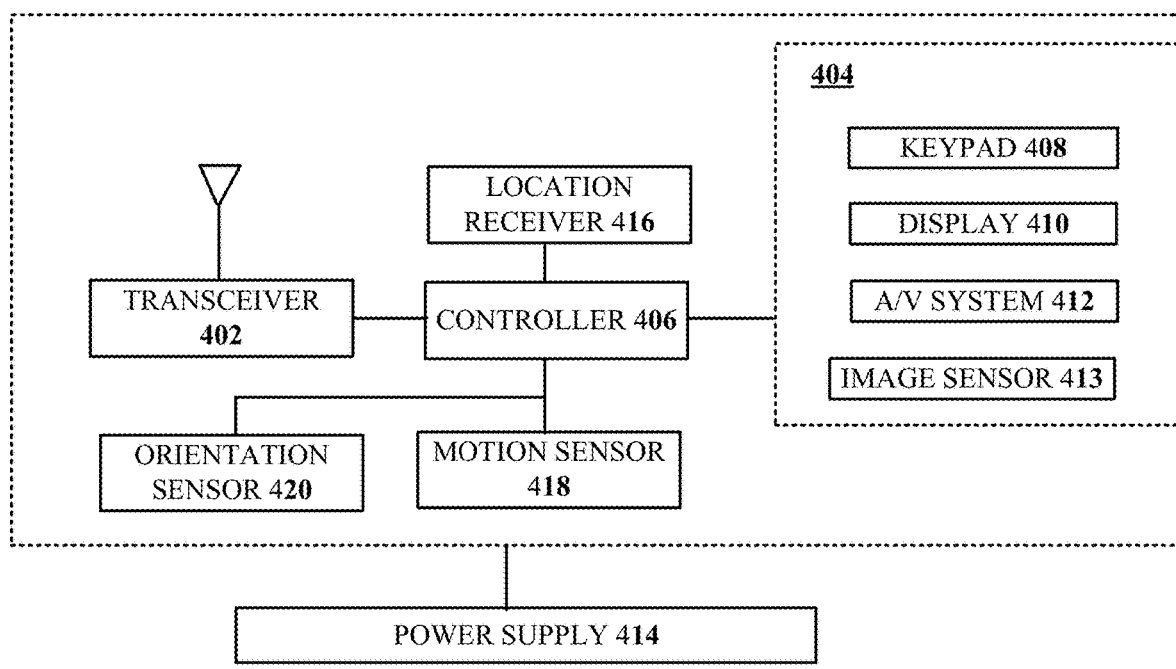
FIG. 4 is a block diagram of an example, non-limiting embodiment of a communication device in accordance with various aspects described herein.

Turning now to FIG. 4, an illustrative embodiment of a communication device 400 is shown. The communication device 400 can serve as an illustrative embodiment of devices such as data terminals, mobile devices, vehicle, display devices or other client devices for communication via a communications network. For example, communication device 400 can facilitate in whole or in part a vehicle control architecture that utilizes an inner layer of a deep neural network and an outer layer of the deep neural network.

The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface having graphical user interface (GUI) elements that can be selected by a user with a touch of a finger. The display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable communications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject disclosure, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, vehicle movement history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

REFERENCES

[1] Ian Goodfellow, Yoshua Bengio, and Aaron Courville. Deep learning. MIT press, 2016.

[2] R M Sanner and J.-J. E. Slotine. Gaussian networks for direct adaptive control. Neural Networks, IEEE Transactions on, 3 (6): 837-863, 11 1992.

[3] Miao Liu, Girish Chowdhary, Bruno Castra da Silva, Shih-Yuan Liu, and Jonathan P How. Gaussian processes for learning and control: A tutorial with examples. IEEE Control Systems Magazine, 38 (5): 53-86, 2018.

[4] Dong Yu, Michael L. Seltzer, Jinyu Li, Jui-Ting Huang, and Frank Seide. Feature Learning in Deep Neural Networks-Studies on Speech Recognition Tasks. arXiv e-prints, page arXiv: 1301.365 January 2013.

[5] Geoffrey Hinton, Li Deng, Dong Yu, George Dahl, Abdel-rahman Mo-hamed, Navdeep Jaitly, Andrew Senior, Vincent Vanhoucke, Patrick Nguyen, Brian Kingsbury, et al. Deep neural networks for acoustic modeling in speech recognition. IEEE Signal processing magazine, 29, 2012.

[6] Volodymyr Mnih, Koray Kavukcuoglu, David Silver, *Andrei* A Rusu, Joel Veness, Marc G Bellemare, Alex Graves, Martin Riedmiller, Andreas K Fidjeland, Georg Ostrovski, and others. Human-level control through deep reinforcement learning. Nature, 518 (7540): 529-533, 2015.

[7] P Ioannou and J Sun. Theory and design of robust direct and indirect adaptive-control schemes. International Journal of Control, 47 (3): 775-813, 1988.

[8] Gang Tao. Adaptive control design and analysis, volume 37. John Wiley & Sons, 2003.

[9] J.-B. Pomet and L Praly. Adaptive nonlinear regulation: estimation from the Lyapunov equation. Automatic Control, IEEE Transactions on, 37 (6): 729-740, 6 1992.

[10] Petros A Ioannou and Jing Sun. Robust adaptive control, volume 1. PTR Prentice-Hall Upper Saddle River, NJ, 1996.

[11] Anuradha M Annaswamy and Kumpati S Narendra. Adaptive control of simple time-varying systems. In Decision and Control, 1989., Proceedings of the 28th IEEE Conference on, page 1014?1018 vol. 2, 12 1989.

[12] Naira Hovakimyan and Chengyu Cao. 1 Adaptive Control Theory: Guaranteed Robustness with Fast Adaptation. SIAM, 2010.

[13] Girish Chowdhary, Tansel Yucelen, Maximillian Mu"hlegg, and Eric N Johnson. Concurrent learning adaptive control of linear systems with exponentially convergent bounds. International Journal of Adaptive Control and Signal Processing, 27 (4): 280-301, 2013.

[14] Girish Chowdhary, Hassan A Kingravi, Jonathan P How, and Patri-cio A Vela. Bayesian nonparametric adaptive control using gaussian processes. Neural Networks and Learning Systems, IEEE Transactions on, 26 (3): 537-550, 2015.

[15] Girish Joshi and Girish Chowdhary. Adaptive control using gaussian-process with model reference generative network. In 2018 IEEE Conference on Decision and Control (CDC), pages 237-243. IEEE, 2018.

[16] Bernhard Scholkopf, Ralf Herbrich, and Alex Smola. A Generalized Representer Theorem. In David Helmbold and Bob Williamson, edi-tors, Computational Learning Theory, volume 2111 of Lecture Notes in Computer Science, pages 416-426. Springer Berlin/Heidelberg, 2001.

[17] Bernhard Scho"lkopf and Alexander J Smola. Learning with kernels: Support vector machines, regularization, optimization, and beyond. MIT press, 2002.

[18] Carl Edward Rasmussen and Christopher K I Williams. Gaussian process for machine learning. MIT press, 2006.

[19] K Hornik, M Stinchcombe, and H White. Multilayer Feedforward Networks are Universal Approximators. Neural Networks, 2:359-366, 1989.

[20] Hrushikesh Mhaskar, Qianli Liao, and Tomaso Poggio. Learning Functions: When Is Deep Better Than Shallow. arXiv e-prints, page arXiv: 1603.00988, March 2016.

[21] Tomaso Poggio, Hrushikesh Mhaskar, Lorenzo Rosasco, Brando Mi-randa, and Qianli Liao. Why and when can deep—but not shallow-networks avoid the curse of dimensionality: A review. International Journal of Automation and Computing, 14 (5): 503-519, October 2017.

[22] Chiyuan Zhang, Samy Bengio, Moritz Hardt, Benjamin Recht, and Oriol Vinyals. Understanding deep learning requires rethinking gen-eralization. arXiv e-prints, page arXiv: 1611.03530, November 2016.

[23] Matus Telgarsky. Benefits of depth in neural networks. arXiv e-prints, page arXiv: 1602.04485, February 2016.

[24] F L Lewis. Nonlinear Network Structures for Feedback Control. Asian Journal of Control, 1:205-228, 1999.

[25] Richard S Sutton, Andrew G Barto, and Ronald J Williams. Rein-forcement learning is direct adaptive optimal control. IEEE Control Systems Magazine, 12 (2): 19-22, 1992.

[26] Hamidreza Modares, Frank L Lewis, and Mohammad-Bagher Naghibi-Sistani. Integral reinforcement learning and experience replayfor adaptive optimal control of partially-unknown constrained-input continuous-time systems. Automatica, 50 (1): 193-202, 2014.

[27] Jooyoung Park and Irwin W Sandberg. Universal approximation using radial-basis-function networks. Neural computation, 3 (2): 246-257, 1991.

[28] Karl J A°stro¨m and Bjo¨mn Wittenmark. Adaptive control. Courier Corporation, 2013.

[29] F L Lewis. Nonlinear network structures for feedback control. Asian Journal of Control, 1 (4): 205-228, 1999.

[30] Gregory Larchev, Stefan Campbell, and John Kaneshige. Projection operator: A step toward certification of adaptive controllers. In AIAA Infotech@ Aerospace 2010, page 3366. 2010.

[31] Kumpati S Narendra and Anuradha M Annaswamy. Stable adaptive systems. Courier Corporation, 2012.

[32] Thomas Kailath. Linear systems, volume 156. Prentice-Hall Engle-wood Cliffs, NJ, 1980.

[33] Huan Xu and Shie Mannor. Robustness and generalization. Machine learning, 86 (3): 391-423, 2012.

[34] Sara A. van de Geer and Peter Bhlmann. On the conditions used to prove oracle results for the lasso. Electron. J. Statist., 3:1360-1392, 2009.

[35] G. Chowdhary and E. Johnson. A singular value maximizing data recording algorithm for concurrent learning. In Proceedings of the 2011 American Control Conference, pages 3547-3552 June 2011.

[36] Daniel Jakubovitz, Raja Giryes, and Miguel R. D. Rodrigues. Generalization Error in Deep Learning. arXiv e-prints, page arXiv: 1808.01174, August 2018.

[37] Girish Joshi and Radhakant Padhi. Robust control of quadrotors using neuro-adaptive control augmented with state estimation. In AIAA Guidance, Navigation, and Control Conference, page 1526, 2017.

[38] Hao Yu and Bogdan M Wilamowski. Levenberg-marquardt training. Industrial electronics handbook, 5 (12): 1, 2011.

What is claimed is:

1. A device comprising:
a processing system including a processor; and
a memory that stores executable instructions that, when executed by the processing system, perform operations, the operations comprising:
receiving sensor data from one or more sensors of an autonomous vehicle;
determining based at least in part upon the sensor data, at a slower time-scale, inner layer weights of an inner layer of a deep neural network;
providing periodically to an outer layer of the deep neural network, directly from the inner layer, a feature vector based upon the inner layer weights;
determining, at a faster time-scale, outer layer weights of the outer layer, wherein the outer layer weights are determined in accordance with a Model Reference Adaptive Control (MRAC) update law that is based upon the feature vector from the inner layer, and wherein the outer layer weights are determined more frequently than the inner layer weights; and
using one or more estimates of uncertainty from the outer layer of the deep neural network to cause one or more actuators, one or more motors, or a combination thereof to control operation of the autonomous vehicle via real-time adaptive feedback.

2. The device of claim 1, wherein:
the slower time-scale is such that the inner layer weights are determined periodically at a first rate as a batch process;
the feature vector is provided to the outer layer at the first rate;
the faster time-scale is such that the outer layer weights are determined essentially in real-time;
the outer layer weights are determined using the feature vector that is provided from inner layer updates; and
the outer layer weights are updated in a manner to ensure system stability by ensuring that a Lyapunov function is non increasing, that a total energy of the system is non increasing, or any combination thereof.

3. The device of claim 2, wherein the batch process by which the inner layer weights are determined periodically at the first rate is based upon output from the outer layer.

4. The device of claim 1, wherein:
the operations further comprise providing the one or more estimates of uncertainty from the outer layer of the deep neural network to a controller;
the one or more estimates of uncertainty are based upon the feature vector from the inner layer; and
a reference command is generated by a model predictive controller, by another optimal control method, or by any combination thereof.

5. The device of claim 4, wherein the controller is used to control the operation of the autonomous vehicle.

6. The device of claim 1, wherein the autonomous vehicle is an autonomous flying drone.

7. The device of claim 1, wherein the device is part of the autonomous vehicle.

8. The device of claim 4, wherein the inner layer of the deep neural network, the outer layer of the deep neural network and the controller operate to provide a boundedness guarantee in reference tracking.

9. The device of claim 8, wherein the inner layer of the deep neural network, the outer layer of the deep neural network and the controller operate in conjunction with a reference model to provide the boundedness guarantee in the reference tracking.

10. The device of claim 1, wherein:
the providing periodically is at an outer layer update time-scale that is a different time-scale than the slower time-scale; and
between successive updates of the inner layer weights and providing of a new feature vector to the outer layer, the outer layer utilizes a prior feature vector to determine a current set of outer layer weights.

11. A non-transitory computer-readable storage medium comprising executable instructions that, when executed by a processing system including a processor, perform operations, the operations comprising:
receiving sensor data from one or more sensors of an autonomous vehicle;
determining based at least in part upon the sensor data, at a slower time-scale, inner layer weights of an inner layer of a deep neural network;
providing periodically to an outer layer of the deep neural network, directly from the inner layer, a feature vector based upon the inner layer weights;
determining, at a faster time-scale, outer layer weights of the outer layer, wherein the outer layer weights are determined in accordance with a Model Reference Adaptive Control (MRAC) update law that is based upon the feature vector from the inner layer, and wherein the outer layer weights are determined more frequently than the inner layer weights; and
using one or more estimates of uncertainty from the outer layer of the deep neural network to cause one or more actuators, one or more motors, or a combination thereof to control operation of the autonomous vehicle via real-time adaptive feedback.

12. The non-transitory computer-readable storage medium of claim 11, wherein:
the slower time-scale is such that the inner layer weights are determined periodically at a first rate as a batch process.

13. The non-transitory computer-readable storage medium of claim 12, wherein:
the feature vector is provided to the outer layer at the first rate.

14. The non-transitory computer-readable storage medium of claim 11, wherein:
the faster time-scale is such that the outer layer weights are determined essentially in real-time.

15. The non-transitory computer-readable storage medium of claim 11, wherein:
the outer layer weights are updated in a manner to ensure system stability by ensuring that a Lyapunov function is non increasing, that a total energy of the system is non increasing, or any combination thereof.

16. A method comprising:
receiving, by a processing system including a processor, sensor data from one or more sensors of an autonomous vehicle;
determining based at least in part upon the sensor data by the processing system, at a slower time-scale, inner layer weights of an inner layer of a deep neural network;
providing periodically, by the processing system, to an outer layer of the deep neural network, directly from the inner layer, a feature vector based upon the inner layer weights;
determining by the processing system, at a faster time-scale, outer layer weights of the outer layer, wherein the outer layer weights are determined in accordance with a Model Reference Adaptive Control (MRAC) update law that is based upon the feature vector from the inner layer, and wherein the outer layer weights are determined more frequently than the inner layer weights; and
using by the processing system one or more estimates of uncertainty from the outer layer of the deep neural network to cause one or more actuators, one or more motors, or a combination thereof to control operation of the autonomous vehicle via real-time adaptive feedback.

17. The method of claim 16, wherein:
the method further comprises providing, by the processing system, the one or more estimates of uncertainty from the outer layer of the deep neural network to a controller;
the one or more estimates of uncertainty are based upon the feature vector from the inner layer; and
a reference command is generated by a model predictive controller, by another optimal control method, or by any combination thereof.

18. The method of claim 17, wherein the controller is used to control the operation of the autonomous vehicle.

19. The method of claim 17, wherein the inner layer of the deep neural network, the outer layer of the deep neural network and the controller operate to provide a boundedness guarantee in reference tracking.

20. The method of claim 19, wherein the inner layer of the deep neural network, the outer layer of the deep neural network and the controller operate in conjunction with a reference model to provide the boundedness guarantee in the reference tracking.

* * * * *